US012367241B2

(12) United States Patent
Singh et al.

(10) Patent No.: US 12,367,241 B2
(45) Date of Patent: Jul. 22, 2025

(54) SYSTEM AND TECHNIQUES FOR ENRICHING LOG RECORDS WITH FIELDS FROM OTHER LOG RECORDS IN STRUCTURED FORMAT

(71) Applicant: Oracle International Corporation, Redwood Shores, CA (US)

(72) Inventors: Satinder Singh, Uttar Pradesh (IN); Kiran Palukuri, Karnataka (IN); Jerry Russell, Seattle, WA (US); Pankaj Agrawal, Telangana (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/448,058

(22) Filed: Aug. 10, 2023

(65) Prior Publication Data

US 2024/0303273 A1 Sep. 12, 2024

Related U.S. Application Data

(60) Provisional application No. 63/450,927, filed on Mar. 8, 2023.

(51) Int. Cl.
*G06F 16/81* (2019.01)
*G06F 16/17* (2019.01)

(52) U.S. Cl.
CPC .......... *G06F 16/81* (2019.01); *G06F 16/1734* (2019.01)

(58) Field of Classification Search
CPC .............................. G06F 16/81; G06F 16/1734
See application file for complete search history.

(56) References Cited

U.S. PATENT DOCUMENTS

| | | | | |
|---|---|---|---|---|
| 11,947,504 B1* | 4/2024 | Shah | G06F 16/258 |
| 2008/0140705 A1* | 6/2008 | Luo | G06F 40/169 |
| 2016/0063576 A1* | 3/2016 | Paterson | G06Q 30/0276 705/14.72 |
| 2019/0324887 A1* | 10/2019 | Santos | G06F 11/3612 |
| 2022/0179905 A1* | 6/2022 | Falcetano | G06F 40/143 |
| 2024/0163668 A1* | 5/2024 | Bassi | H04W 12/065 |

* cited by examiner

*Primary Examiner* — Jay A Morrison
(74) *Attorney, Agent, or Firm* — MUGHAL GAUDRY & FRANKLIN PC

(57) ABSTRACT

Embodiments relate to extracting various portions of log messages. Syntax, order and/or level information that differentiates header and detail message is identified. This syntax, order and/or level information is used to automatically associate enhance each of one or more detail log entries with information that provides context. This approach can facilitate efficient transmission of detail-information log entries that reduces redundant information, while still supporting flexible approaches for providing information that can enhance detail-information log entries.

20 Claims, 26 Drawing Sheets

300

```
302  {
310      "namespace": "oci_streaming",
312      "name": "MemUsage",
304      "datapoints": [
             {
                     "timestamp": 1652942170000,
                     "value": 45.5,
                     "count": 2
306          },
             {
                     "timestamp": 1652942171001,
                     "value": 43.0,
                     "count": 1
             }
         ],
308      "metadata": {
             "displayName": "Memory Usage",
             "unit": "percentage"
         }
     }
```

JSON example log content

```
      [
        {
          "namespace": "oci_operations_insights",
          "compartmentId": "ocid1.compartment.oc1..unique_ID",
          "name": "DataFlowDelayInHrs",
402a      "dimensions": {
            "sourceMetricName": "cpu_usage",
            "resourceId": "ocid1.opsidatabaseinsight.oc1..unique_ID",
            "telemetrySourceType": "CloudInfrastructure"
          },
          "metadata": {},
        "datapoints": [
          {
            "timestamp": 1652945412000,
            "value": 0,
404a        "count": 1
          },
          {
            "timestamp": 1652945413000,
            "value": 0,
            "count": 2
          }
        ]
      },
      {
        "namespace": "oci_cloudevents",
        "resourceGroup": null,
402b    "compartmentId": "ocid1.compartment.oc1..unique_ID",
        "name": "MarchedEvents",
        "dimensions": {
          "resourceId": "ocid1.eventrule.oc1..unique_ID",
        },
        "metadata": {
          "description": "The number of events matched for the rule",
          "displayName": "Matched Events",
          "unit": "Count"
        },
404b    "datapoints": [
          {
            "timestamp": 1652944184000,
            "value": 1,
            "count": 1
          }
        ]
```

```
    },
    {
      “namespace”: “oci_instancepools”,
      “resourceGroup”: null,
      “compartmentId”: ”ocid1.compartment.oc1..unique_ID”,
      “name”: “ProvisioningInstances”,
402c  “dimensions”: {
        “resourceId”: “ocid1.instancepool.oc1..unique_ID”,
        “region”: “phx”
      },
      “metadata”: {},
      “datapoints”: [
404c    {
          “timestamp”: 1652943740563,
          “value”: 0,
          “count”: 1
        }
      ]
    },
    {
      “namespace”: “oci_autonomous_database”,
      “resourceGroup”: null,
      “compartmentId”: ”ocid1.compartment.oc1..unique_ID”,
402d  “name”: “QueryLatency”,
      “dimensions”: {
        “deploymentType”: “Shared”,
        “displayName”: “QueryLatency”
      },
      “metadata”: {},
      “datapoints”: [
404d    {
          “timestamp”: 1652943720000,
          “value”: 3,
          “count”: 1
        }
      ]
    },
    {
      “namespace”: “oci_autonomous_database”,
      “resourceGroup”: null,
      “compartmentId”: ”ocid1.compartment.oc1..unique_ID”,
402e  “name”: “ConnectionLatency”,
      “dimensions”: {
        “AutonomousDBType”: “ATP”,
        “resourceId”: “OCID1.AUTONOMOUSDATABASE.OC1..unique_ID”,
        “displayName”: “ConnectionLatency”
      },
      “metadata”: {},
      “datapoints”: [
404e    {
          “timestamp”: 1652943720000,
          “value”: 1713,
          “count”: 1
        }
      ]
    }
  ]
```

604
Log entries
602 {
  {
    "timestamp": 1652945412000, "value":0, "count": 1
  },
  {
    "timestamp": 1652945413000, "value":0, "count": 2
  },
  {
    "timestamp": 1652944184000, "value":1, "count": 1
  },
  {
    "timestamp": 1652943740563, "value":0, "count": 1
  },
  {
    "timestamp": 1652943720000, "value":3, "count": 1
  },
  {
    "timestamp": 1652943720000, "value":1713, "count": 1
  }, (606 → "value"; 608 → "count")

700

Header=$, Details=$.data

JSON Text:

```
{
  "id" : "id_ERROR1",                                   } 702
  "data": {                                             ┐
    "id": "data_id_ERROR1",                             │
    "childblock0": {                                    │
      "src": "127.0.0.1"                                │
    },                                                  │
    "childblocks": [                                    │
      {                                                 │
        "childblock": {                                 │
          "srchost1": "host1_ERROR1"                    │ 704
        }                                               │
      },                                                │
      {                                                 │
        "childblock": {                                 │
          "srchost2": "host2_ERROR1"                    │
        }                                               │
      }                                                 ┘
    ],
    "hdr": {                                            ┐
      "time_ms": "2021-05-21T04:27:18.89714589Z",       │
      "error": "hdr_ERROR1"                             │
                                                        │ 702
  }                                                     │
 },                                                     │
 "compartmentName": "comp_name_ERROR1",                 │
 "eventName": "GetBucket_ERROR1"                        ┘
}
```

Extracted and *Enriched* Log Entries:

Header Log Entry : {"id":"id_ERROR1","compartmentName":"comp_name_ERROR1","eventName":"GetBucket_ERROR1"}
Details Log Entry : { "compartmentName":"comp_name_ERROR1","eventName":"GetBucket_ERROR1","id": "id_data_ERROR1","childblock0":{"src":"127.0.01"},"childblocks":[{"childblock":{"srchost1":"host1_ERROR1"}},{"childblock":{" srchost2":"host2_ERROR1"}}],"hdr":{"time_ms":"2021-05-21T04:27:18.89714589Z","error":"hdr_ERROR1"}}

Header=$.metadata, Details=$.datapoints[*]

JSON Text:

```
{
  "namespace":"oci_streaming",
  "resourceGroup":null,
  "name":"GetMessagesThroughput.Count1",
  "dimensions":{
    "region":"phx1",
    "resourceId": "ocid1.stream.oc1.phx.1"
  },
  "datapoints":[
    {
      "timestamp":1652942170000,
      "value": 1.1,
      "count": 11
    },
    {
      "timestamp":1652942171001,
      "value": 1.2,
      "count": 12
    },
  ],
  "metadata":{
    "displayName":"Get Messages 1",
    "unit":"count1"
  }
}
{
  "namespace":"oci_streaming",
  "resourceGroup":null,
  "name":"GetMessagesThroughput.Count1",
  "dimensions":{
    "region":"phx1",
    "resourceId": "ocid1.stream.oc1.phx.1"
  },
  "datapoints":[
    {
      "timestamp":1652942170000,
      "value": 1.1,
      "count": 11
    },
    {
      "timestamp":1652942171001,
      "value": 1.2,
      "count": 12
    }
  ]
}
```

802 804 808 802 804

Extracted and *Enriched* Log Entries:

Header Log Entry : {"displayName":"Get Messages 1","unit":"count1"}
Details Log Entry : {"displayName":"Get Messages 1","unit":"count1", "timestamp":1652942170000,"value":1.1,"count":11}
Details Log Entry : {"displayName":"Get Messages 1","unit":"count1", "timestamp":1652942171001,"value":1.2,"count":12}
Details Log Entry : {"timestamp":1652942170002,"value":2.1,"count":21}
Details Log Entry : {"timestamp":1652942171003,"value":3.2,"count":32}

Header=$.instanceHealths:[*], Details=$.instanceHealths[*].instanceHealthChecks[*]

JSON Text:

```
{
  "reportType": "Health Status Report 1",
  "instanceHealths": [                          } 902
   {
    "instanceHealthChecks": [
      {                                         ┐
        "HealthCheckName": "Check-A1",          │
        "Result": "Passed",                     │
        "time": "2022-11-17T06:05:01Z"          │
      },                                        ├ 904
      {                                         │
        "HealthCheckName": "Check-A2",          │
        "Result": "Passed",                     ┘
        "time": "2022-11-17T06:05:01Z"
      }
    ],                                          } 902
    "Datacenter-A" : "Remote A"
   }
  ]
}
```

Extracted and *Enriched* Log Entries:

Header Log Entry : {"Datacenter-A":"Remote A"}

Details Log Entry : {"Datacenter-A":"Remote A", "HealthCheckName":"Check-A1","Result":"Passed","time":"2022-11-17T06:05:01Z"}

Details Log Entry : {"Datacenter-A":"Remote A", "HealthCheckName":"Check-A2","Result":"Passed","time":"2022-11-17T06:05:01Z"}

Header1=$.dimensions, Header2=$.metadata, Details=$.datapoints[*]

JSON Text:

```
{
  "namespace":"oci_streaming",
  "resourceGroup":null,
  "name":"GetMessagesThroughput.Count1",        1002
  "dimensions":{
    "region":"phx1",
    "resourceId":"ocid1.stream.oc1.phx.1"
  },
  "datapoints":[
    {
      "timestamp":1652942170000,
      "value":1.1,
      "count":11                                  1004
    },
    {
      "timestamp":1652942171001,
      "value":1.2,
      "count":12
    }
  ],
  "metadata":{                                    1002
    "displayName":"Get Messages 1",
    "unit":"count1"
  }
}
```

Extracted and *Enriched* Log Entries:

Header1 Log Entry : {"region":"phx1","resourceId":"ocid1.stream.oc1.phx.1"}
Header2 Log Entry : {"displayName":"Get Messages 1","unit":"count1"}
Details Log Entry : {"region":"phx1","resourceId":"ocid1.stream.oc1.phx.1", "displayName":"Get Messages 1","unit":"count1", "timestamp":1652942170000,"value":1.1,"count":11}
Details Log Entry : {"region":"phx1","resourceId":"ocid1.stream.oc1.phx.1", "displayName":"Get Messages 1","unit":"count1", "timestamp":1652942171001,"value":1.2,"count":12}

Header=$, Details=$

Since JSON path is same for both header and details parser, we use special constructs to identify each block as header or details, in following example, we use field "module" to identify header and details. In header parser we use "type=hdr1", in details parser we have "type=body".

JSON Text

```
{
  "type": "hdr1",
  "id": "data_id_ERROR1",          } 1102
  "error": "hdr1_error1"
}
{
  "type": "body",
  "id": "data_id_ERROR2",          } 1104
  "error": "body_ERROR2"
 }
}
{
  "type": "body",
  "id": "data_id_ERROR3",          } 1104
  "error": "body_ERROR3"
}
```

Extracted and *Enriched* Log Entries:

```
Header Log Entry : {"type":"hdr1","id":"data_id_ERROR1", "error":"hdr1_error1"}
Details Log Entry  : {"type":"hdr1","id":"data_id_ERROR1","error":"hdr1_error1","module":"body",
"id":"data_id_ERROR2","error":"body_ERROR2"}                                              } 1106
Details Log Entry  : {"type":"hdr1","id":"data_id_ERROR1","error":"hdr1_error1","module":"body",
"id":"data_id_ERROR3","error":"body_ERROR3"}
```

Header1=$.hdr1, Header2=$.hdr2, Details=$.body

In this case, header log entry is associated with details log entry if both are in same block.
JSON Text:

```
{
  "hdr1": {
    "id": "data_id_ERROR1",        } 1202a
    "error": "hdr1_error1"
  }
}
{
  "body": {
    "id": "data_id_ERROR2",        } 1204a
    "error": "body_ERROR2"
  }
}
{
  "hdr2": {

    "id": "data_id_ERROR3",        } 1202b
    "error": "hdr2_error3"
  }
  "body": {
    "id": "data_id_ERROR4",        } 1204b
    "error": "body_ERROR4"
  }
}
```

Extracted and *Enriched* Log Entries:

```
Header Log Entry : {"id":"data_id_ERROR1","error":"hdr1_error1"}
Details Log Entry  : {"id":"data_id_ERROR2","error":"body_ERROR2"}
Header Log Entry : {"id":"data_id_ERROR3","error":"hdr2_error3"}           } 1206
Details Log Entry  : {                    "error":"HDR2_error3","id":"data_id_ERROR4","error":
"body_ERROR4"}}
```

FIG. 12

Test

Test Results

A log file has a header log entry and body log entries. The Header Detail function uses the header log entry to enrich the body log entry.

▨ Fields extracted with this parser ▨ Fields extracted with Header Content parser

| Match Status | Time | Original Log Content | | | |
|---|---|---|---|---|---|
| ● Success | 2206 | { "namespace": "oci_streaming", "name": "memUsage", "datapoints": [... | | | |
| | 2208 | Display Name = Memory Usage | Unit = percentage | | Name = MemUsage |
| ● Success | 2210 | { "timestamp":1652942170000, "value":45.5, "count": 2 } | | | |
| | 2208 | Display Name = Memory Usage | Unit = percentage | | Name = MemUsage |
| | 2212 | Count = 2 | | time = 2022-05-19T06:36:10.000Z | Value = 45.5 |
| ● Success | 2210 | { "timestamp":1652942171001, "value":43, "count": 1 } | | | |
| | 2208 | Display Name = Memory Usage | Unit = percentage | | Name = MemUsage |
| | 2212 | count = 1 | | time = 2022-05-19T06:36:11.001Z | value = 43.0 |

Add    Cancel — 2214

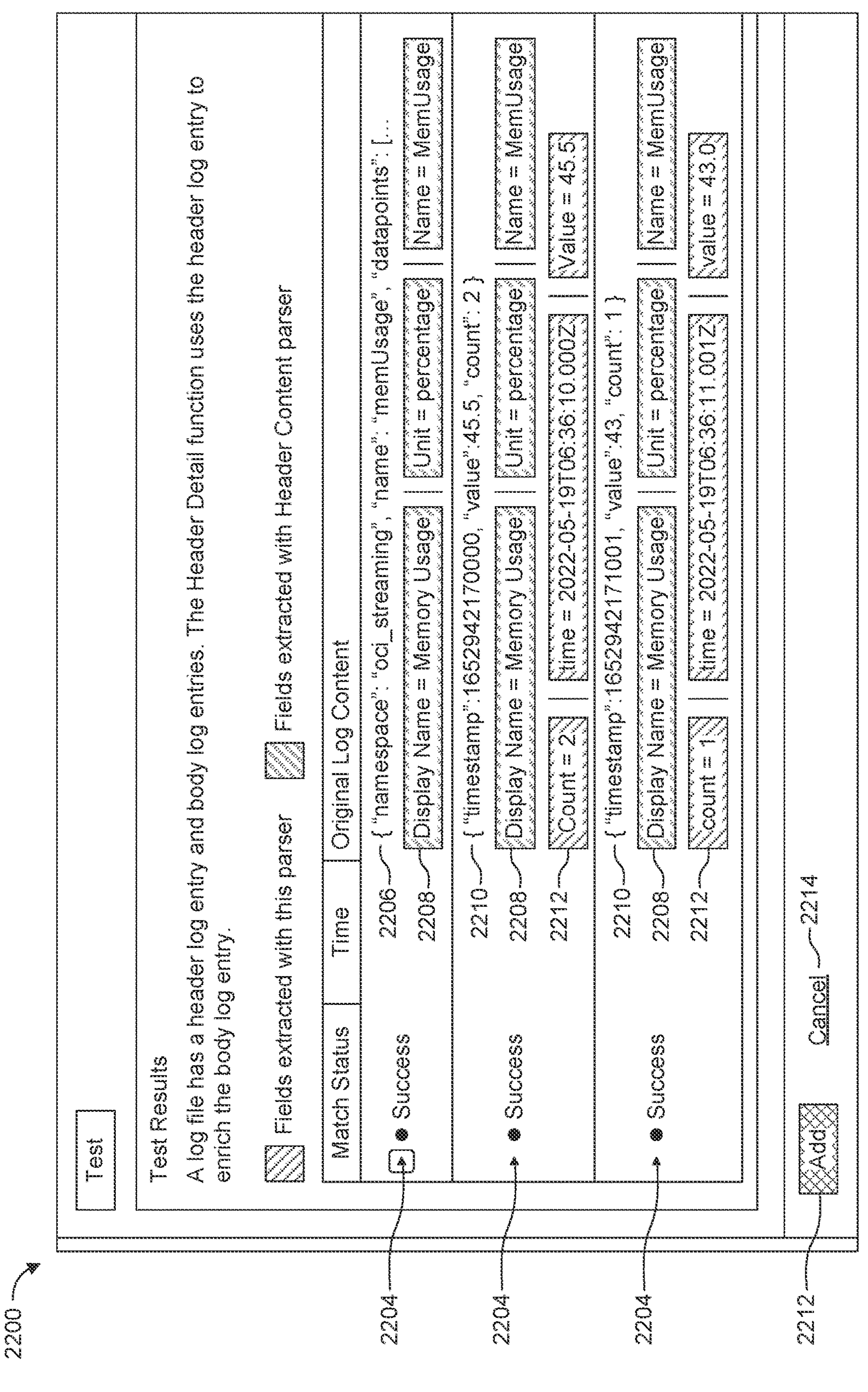

FIG. 22

SYSTEM AND TECHNIQUES FOR ENRICHING LOG RECORDS WITH FIELDS FROM OTHER LOG RECORDS IN STRUCTURED FORMAT

CROSS-REFERENCES TO RELATED APPLICATIONS

This application claims the benefit of U.S. Provisional Patent Application No. 63/450,927, filed Mar. 8, 2023, which is hereby incorporated by reference in their entirety and for all purposes.

FIELD OF THE INVENTION

The present disclosure relates generally to structured data formats, specifically techniques to enrich log records by extracting the common information and tagging it to the log records.

BACKGROUND

Many types of computing systems and applications generate vast amounts of data pertaining to or resulting from the operation of that computing system or application. These vast amounts of data are often stored into collected locations, such as log files, which can then be reviewed at a later time period if there is a need to analyze the behavior or operation of the system or application.

Server administrators and application administrators can benefit by learning about and analyzing the contents of the system log records. However, it can be a very challenging task to collect and analyze these records. There are many reasons for these challenges.

One significant issue pertains to the fact that many modern organizations possess a very large number of computing systems, each having numerous applications that run on those computing systems. It can be very difficult in a large system to configure, collect, and analyze log records given the large number of disparate systems and applications that run on those computing devices. Furthermore, some of those applications may actually run on and across multiple computing systems, making the task of coordinating log configuration and collection even more problematic.

Conventional log analytics tools provide rudimentary abilities to collect and analyze log records. However, conventional systems cannot efficiently scale when posed with the problem of massive systems involving large numbers of computing systems having large numbers of applications running on those systems. This is because conventional systems often work on a per-host basis, where set-up and configuration activities need to be performed each and every time a new host is added or newly configured in the system, or even where new log collection/configuration activities need to be performed for existing hosts. This approach is highly inefficient given the extensive number of hosts that exist in modern systems. Furthermore, the conventional approaches, particularly on-premises solutions, also fail to adequately permit sharing of resources and analysis components. This causes significant and excessive amounts of redundant processing and resource usage.

Structured log messages have a known format, syntax or set of keys, such that extraction rules can be written to extract values of interest reliably based on this information. For example, a structured log message may have a JSON or XML format and may include key-value pairs, where the keys have a consistent meaning and representation across log message. However, unstructured log messages lack this consistency in the format, syntax and/or key set, making it more difficult to identify and extract values of interest. For example, with unstructured logging, events can be expressed in plain text. An assumption can be that humans are the main target audience for using logs, which may not always be the case. For instance, being able to search through a set of log files associated with a given entity to find all occurrences of a given event is valuable if a user is trying to troubleshoot some issue or investigating a concerning trend.

A structured log file (e.g., JSON, XML) can include a list of log records and relevant common data that applies to all the log records. For example, many different log records could refer to an error that involves the same namespace and same or different metadata values.

A user or data scientist may want to search through log events to find all instances of a given user performing some action to reports. This task may not be easy to perform, particularly when dealing with unstructured log messages, due to inconsistent format of the messages. Besides reports, users can create other types of artifacts, and such activities are also logged. Using regular expression routines, a data scientist may be able to generate string-searching algorithms or a regular expression routine. However, such code can be error-prone, fragile, and may not generate the most value for data scientist or customers.

Currently, these records may not be connected together unless a search was done already with the previous information that the records exist and the values to search for. It would be beneficial to create a header-details relationship among log records that allows the user interface (UI) to accommodate a drill-down into these application-driven embedded hierarchical relationships.

BRIEF SUMMARY

A structured log files can be an organized list of data entries in a well-structured and consistent format that can be easily read, searched, and analyzed by any application or an interested individual. One standard format for structured log file can be JavaScript Object Notation (JSON) or Extensible Markup Language (XML), although other formats can be used instead.

The header block may not always proceed the details blocks for structured log files. In some cases, the header block and details block can be at different levels within the structure log files. For example, the different levels can include a root level (e.g., $ level) or a sub-level (e.g., $.foo level). In some cases, the header block and the details block are at the same level within the structured log file. In some cases, it can be difficult to associate the metadata with the log data entries. The association between the log entries and header block information can be useful to perform analysis of the log file information.

Existing logging analytics products have parsers that can extract header block information and details block information independent of each other. Existing parsers cannot associate the header block information with the details block information.

In one aspect, techniques can create a header-details relationship among structured log records. With this feature, all detail log records under a datapoints array can be enriched with the fields extracted from header fields (e.g., the data around datapoints array). The enrichment can be achieved by creating two parsers: one for header information and one for detail information and then creating a header-detail relationship between the two. Once the relationship is created, the techniques can add detail fields that are extracted from structured log records after they are matched by header parser. Similarly, the details parser can extract detailed data for all the log records matched by the details parser. The header parser can identify the common fields that can be extracted and later to be enriched to the log entries identified by the details parser.

The details parser can identify details for extraction based on the fields in the log record. In various embodiments, a user can specify the header parser in the details parser definition. In various embodiments, these techniques can create a header-details relationship among log records that allows a user to drill-down into these application-driven embedded hierarchical relationships.

In one aspect, a computer-implemented method can include: accessing a plurality of log records, each of the plurality of log records including data that accords with a particular data structure, the plurality of log records having a particular order, the plurality of log records being associated with a particular client, and the particular data structure being a hierarchical structure; extracting a set of individual log records from the plurality of log records, wherein each of the set of individual log records is at a same level within a hierarchy defined for the particular structure; identifying a syntax for header messages, wherein the syntax for header messages is identified based on data corresponding to the particular client; identifying a syntax for detail messages, wherein the syntax for detail messages is identified based on data corresponding to the particular client; detecting, based on the syntax for header messages, that each of a first subset of the set of individual log records includes header information; detecting, based on the syntax for detail messages, that each of a second subset of the set of individual log records includes detail information; determining, for a particular detail message in the second subset, that header information from at least one header message in the first subset of the set of individual log records applies to detail information in the particular message, wherein the determination is based on at least part of the particular order; enriching the particular detail message with header information in the at least one header message; and availing the enriched message for further processing.

The determining the relationship between the header fields and detail fields may comprise: detecting, for each of the at least one header message in the first subset, a start indicator indicating a start of an object before the particular detail message and a lack of a corresponding end indicator before the particular detail message.

The syntax for details messages or the syntax for header messages may be identified by receiving input via a user interface.

Determining that header information from the at least one header message in the first subset of the set of individual log records applies to detail information in the particular message may comprise: determining that a start indicator for the at least one header message precedes the particular message in the particular order; and determining that a completion of the particular message preceded any end indicator for the at least one header message.

Determining that header information from the at least one header message in the first subset of the set of individual log records applies to detail information in the particular message may comprise: retrieving the header information from the at least one header message in the first subset of the set of individual log records from a cache.

At least part of the at least one header message may be after the particular message in the particular order.

The syntax for header messages may include a particular key-value pair associated with the particular client.

In various aspects, a system is provided that includes one or more data processors and a non-transitory computer readable storage medium containing instructions which, when executed on the one or more data processors, cause the one or more data processors to perform part or all of one or more methods disclosed herein.

In various aspects, a computer-program product is provided that is tangibly embodied in a non-transitory machine-readable storage medium and that includes instructions configured to cause one or more data processors to perform part or all of one or more methods disclosed herein.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

Various embodiments are described hereinafter with reference to the figures. It should be noted that the figures are not drawn to scale and that the elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure.

FIG. 3 is an exemplary extracted data log illustrating an array of log records.

FIG. 4 illustrates a first portion of a first exemplary JSON log

FIG. 5 illustrates a second portion of the first exemplary JSON log.

FIG. 7 illustrates a second exemplary JSON log.

FIG. 8 illustrates a third exemplary JSON log.

FIG. 9 illustrates a fourth exemplary JSON log.

FIG. 10 illustrates a fifth exemplary JSON log.

FIG. 11 illustrates a sixth exemplary JSON log.

FIG. 12 illustrates a seventh exemplary JSON log.

FIG. 22 is an exemplary function test output.

DETAILED DESCRIPTION

Figure 1:
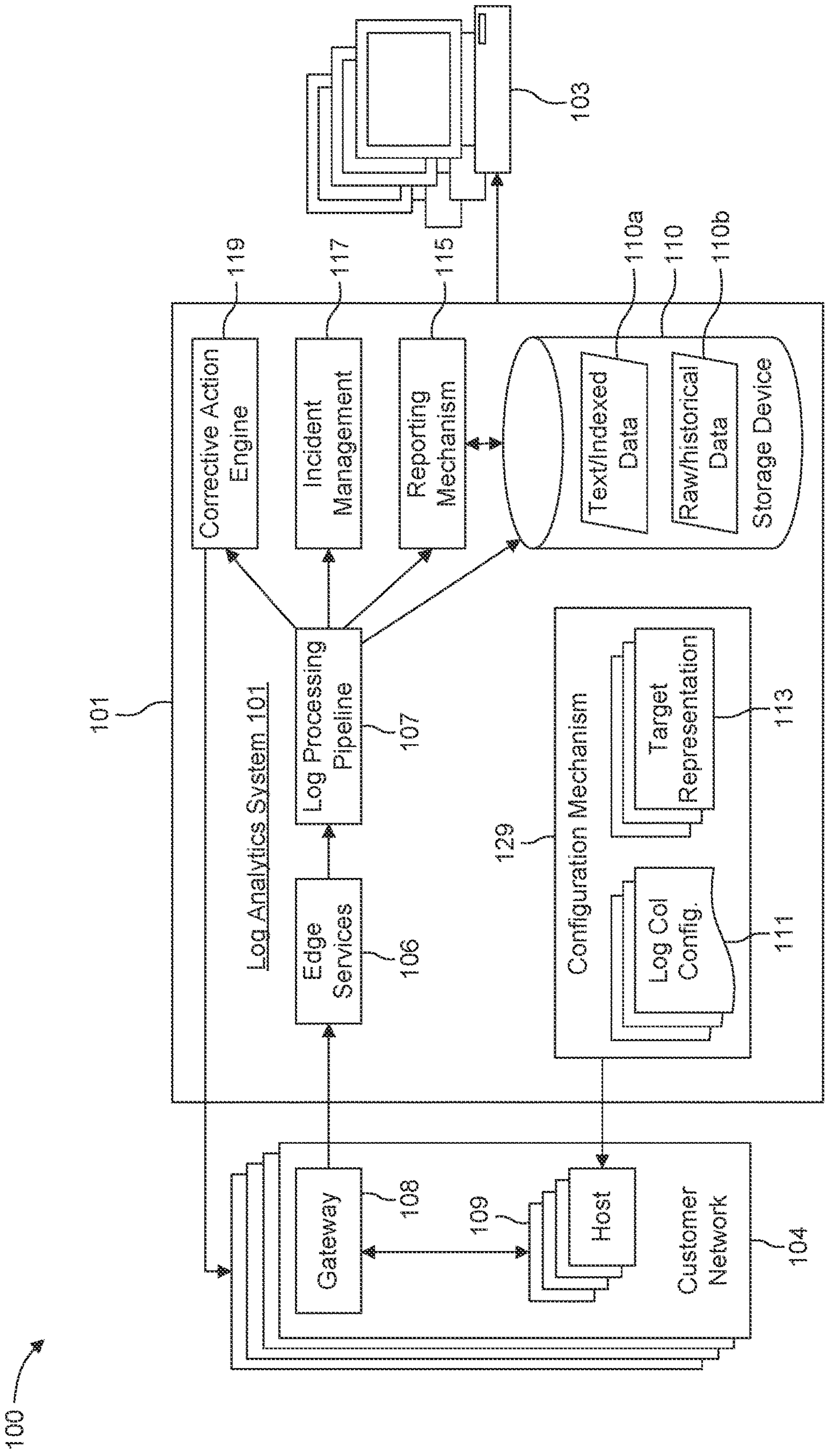
FIG. 1 illustrates an example system which may be employed in some embodiments of the disclosure.

In the following description, for the purposes of explanation, specific details are set forth in order to provide a thorough understanding of certain aspects. However, it can be apparent that various aspects may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other aspects or designs.

A structured log file can be an organized list of data entries (e.g., server errors or access events) in a well-structured and consistent format that can be easily read, searched, and analyzed by any application or an interested individual.

A structured log file can contain data and metadata in a consistent and readable format. Structured log formats can have fields that are separated by a character, such as a comma, space, or hyphen. Some examples of structured log formats can be XML and JSON. Structured logging can help developers find and correlate log messages more easily.

A header block is a set of comments or metadata that provides information that enhances or supplements detail log entries so as to (for example) enhance or provide context or meaning to datapoints in the detail log entries. For example, a header block may identify a namespace, a name, a display name and/or a unit of a variable; and datapoints in a detail log entry may identify a value for the variable, a timestamp associated with the value and/or a current count of the number of values detected for the variable. As described and illustrated herein, header information may be present at a same or different level than the detail log entries (e.g., $ level or $.foo level); and/or the relative order of where the header information appears relative to detail log entries can vary (e.g., where part or all of the header information may be before all corresponding detail log entries; part or all of the header information may be after all corresponding detail log entries, and/or part or all of the header information may be between some detail log entries). This variability results in challenges as to how to accurately and reliably relate pertinent header information with corresponding detail information. However, without being able to accurately associate header and detail information, the detail information becomes isolated from context and/or definitions that provide meaning to the detail information Existing logging analytics have parsers that can extract header block information and details block information independent of each other. Existing parses cannot associate the header block information with the details block information. In an example, header block information may use "server temperature" as a field name. The details block can include "value," "time," and "count." If the header block information is not related to the details block, it may be difficult to determine that "value," "time," and "count" are related to the "server temperature field (e.g., a value of server temperature, a time the server temperature was measured, and a count of the number of times the server temperature was measured.)

In one aspect, techniques can create a header-details relationship among log records. With this feature, the detail log records under a datapoints array can be enriched with the fields extracted from header blocks (data around datapoints array). The enrichment can be achieved by creating two parsers-one for header block information and one for details block information. Then, a user can configure a header-detail relationship between the two. This configuration may occur by (for example) in response to the user interacting with a user interface to specify mapping information, calling an API directly with mapping information, and so on. Once the relationship is created, the techniques can add fields extracted from log data matched by the header parser, to all the log data matched by the details parser. The header parser can identify the header fields to be extracted and later used to enrich one or more log entries identified by details parser.

Each of the header parser and the details parser can be configured to detect header and detail information (respectively) based on one or more syntax specifications. The syntax specification(s) may be identified based on client input (e.g., as received via a graphical user interface) or based on automated pattern detection using a supervised technique (e.g., that detects syntax-specification differences between a set of log data labeled as being "header data" and a set of log data labeled as being "detail data"). To illustrate, an unsupervised technique may identify two or more classes of log entries in log data may infer that a first cluster corresponds to detail information and a second cluster corresponds to header information. The inference may be based on an assumption or empirical data indicating that a count of entries in a cluster corresponding to detail information is larger than a count of entries in a cluster corresponding to header information. The inference may additionally or alternatively be based on an assumption or empirical data indicating that a size statistic (e.g., a mean, median, or mode) of log entries associated with detail information is different than (e.g., larger than or smaller than) a size statistic of log entries associated with header information.

In some instances, a syntax specification may identify a level within a hierarchy (e.g., a root level, a first-degree sub-level, a second-degree sub-level, etc.). The level may be identified by detecting one or more characters that indicate whether and/or which level transitions have occurred from a root level. For example, in a JSON context, a start indicator—such as an open curly bracket ("{") or an open square bracket ("[")—can indicate a transition to a lower level, while an end indicator—such as a closed curly bracket ("}") or closed square bracket ("]")—can indicate a transition back to a higher level. The syntax specifications may be configured to indicate that log data at one given level corresponds to header information, whereas log data at another given level corresponds to detail information.

In some instances, a syntax specification may identify a differential content signature for log data that includes header information relative to log data that includes detail information. For example, the content signature may identify a particular field, for which a value of the field distinguishes whether a given log entry (e.g., defined to start with a prior level transition to a lower level and end with a subsequent level transition to a higher level or defined to start and/or end based on one or more particular characters). The content signature may be a key-value pair, where log data consistently identifies the key and the value is different between log entries with detail information as compared to log entries with header information. Alternatively, the content signature may identify a single term that-if it is present in a given log entry (e.g., generally or within a specified portion of the entry) indicates that the log entry includes header information (or conversely, includes detail information).

Identifying a differential content signature using a syntax specification enables identifying a hierarchical relationship even when log entries are within a same level and when there is no absolute (e.g., language-level) indications as to how to distinguish header information from detail information. For example, both header and detail information may be stored within log entry payload fields (e.g., formatted as separate JSON objects) within log entries. Though this facilitates querying the header and detail information, it (traditionally) makes differentiating between the two types of information more complicated.

Meanwhile, embodiments of the invention support flexible approaches where a syntax specification of header information can be differentiated from a syntax specification of detail information (e.g., based on input collected from a client or user via a user interface or based on a machine-learning approach). Further, syntax specifications (that is automatically identified or identified based on input from a client or user via a user interface) can then be used to determine which log entries with detail information correspond with particular header information. Data can then be represented, received, and processed. Each of one, more or all log entries with detail information can then be enriched with header information associated with the log entries, so as to provide context and meaning to the log data.

As noted above, many types of computing systems and applications generate vast amounts of data pertaining or resulting from operation of that computing system or application. These vast amounts of data are then stored into collected locations, such as log files, which can be reviewed at a later time period if there is a need to analyze the behavior or operation of the system or application. Embodiments of the present disclosure provide an approach for collecting and analyzing these sets of data in an efficient manner. While the below description may describe the disclosure by way of illustration with respect to "log" data, the disclosure is not limited in its scope only to the analysis of log data, and indeed is applicable to wide range of data types. Therefore, the disclosure is not to be limited in its application only to log data unless specifically claimed as such. In addition, the following description may also interchangeably refer to the data being processed as "records" or "messages," without intent to limit the scope of the disclosure to any particular format for the data.

FIG. 1 illustrates an example system 100 for configuring, collecting, and analyzing log data according to some embodiments of the disclosure. System 100 includes a log analytics system 101 that in some embodiments is embodied as a cloud-based and/or SaaS-based (software as a service) architecture. This means that log analytics system 101 is capable of servicing log analytics functionality as a service on a hosted platform, such that each customer that needs the service does not need to individually install and configure the service components on the customer's own network. The log analytics system 101 is capable of providing the log analytics service to multiple separate customers and can be scaled to service any number of customers.

Each customer network 104 may include any number of hosts 109. The hosts 109 are the computing platforms within the customer network 104 that generate log data as one or more log files. The raw log data produced within hosts 109 may originate from any log-producing source. For example, the raw log data may originate from a database management system (DBMS), database application (DB App), middleware, operating system, hardware components, or any other log-producing application, component, or system. One or more gateways 108 are provided in each customer network to communicate with the log analytics system 101.

The system 100 may include one or more users at one or more user stations 103 that use the system 100 to operate and interact with the log analytics system 101. The user station 103 comprises any type of computing station that may be used to operate or interface with the log analytics system 101 in the system 100. Examples of such user stations include, for example, workstations, personal computers, tablet computers, smartphones, mobile devices, or remote computing terminals. The user station can include display device, such as a display monitor, for displaying a user interface to users at the user station. The user station also can include one or more input devices for the user to provide operational control over the activities of the system 100, such as a touchscreen, a pointing device (e.g., mouse or trackball) and/or a keyboard to manipulate a pointing object in a graphical user interface to generate user inputs. In some embodiments, the user stations 103 may be (although not required to be) located within the customer network 104.

The log analytics system 101 can include functionality that is accessible to users at the user stations 101, e.g., where log analytics system 101 is implemented as a set of engines, mechanisms, and/or modules (whether hardware, software, or a mixture of hardware and software) to perform configuration, collection, and analysis of log data. A user interface (UI) mechanism can generate the UI to display the classification and analysis results, and to allow the user to interact with the log analytics system.

Figure 2:
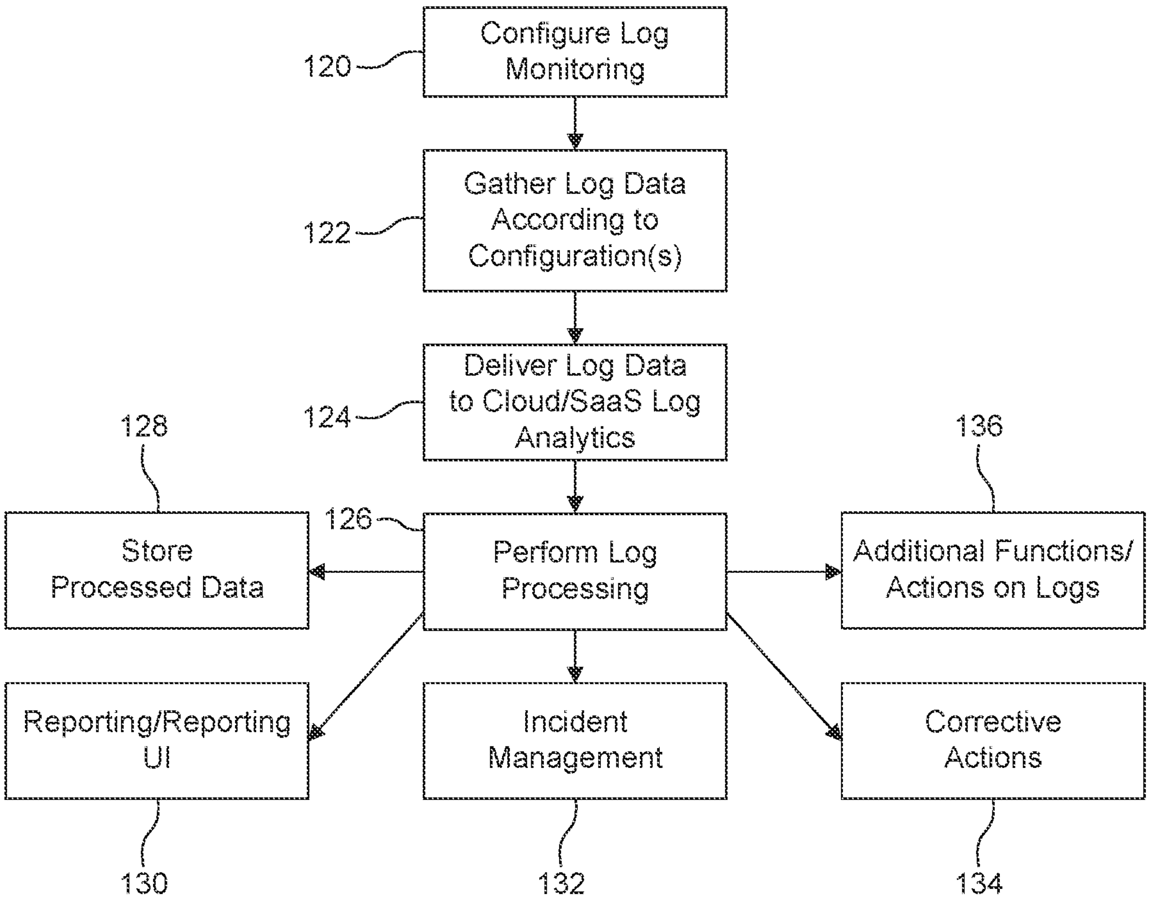
FIG. 2 illustrates a flowchart of a method which may be employed in some embodiments of the disclosure.

FIG. 2 illustrates a flowchart of an approach to use system 100 to configure, collect, and analyze log data. This discussion of FIG. 2 will refer to components illustrated for the system 100 in FIG. 1.

At block 120, log monitoring can be configured within the system. This may occur, for example, by a user/customer to configure the type of log monitoring/data gathering desired by the user/customer. Within system 101, a configuration mechanism 129 comprising UI controls is operable by the user to select and configure log collection configuration 111 and target representations 113 for the log collection configuration.

As discussed in more detail below, the log collection configuration 111 comprise the set of information (e.g., log rules, log source information, and log type information) that identify what data to collect (e.g., which log files), the location of the data to collect (e.g., directory locations), how to access the data (e.g., the format of the log and/or specific fields within the log to acquire), and/or when to collect the data (e.g., on a periodic basis). The log collection configuration 111 may include out-of-the-box rules that are included by a service provider. The log collection configuration 111 may also include customer-defined/customer-customized rules.

The target representations 113 identify "targets", which are individual components within the customer environment that that contain and/or produce logs. These targets are associated with specific components/hosts in the customer environment. An example target may be a specific database application, which are associated with one or more logs one or more hosts.

The ability of the current embodiment to configure log collection/monitoring by associating targets with log rules and/or log sources provides unique advantages for the invention. This is because the user that configures log monitoring does not need to specifically understand exactly how the logs for a given application are located or distributed across the different hosts and components within the environment. Instead, the user only needs to select the specific target (e.g., application) for which monitoring is to be performed, and to then configure the specific parameters under which the log collection process is to be performed.

This solves the significant issue with conventional systems that require configuration of log monitoring on a per-host basis, where set-up and configuration activities need to be performed each and every time a new host is added or newly configured in the system, or even where new log collection/configuration activities need to be performed for existing hosts. Unlike conventional approaches, the log analytics user can be insulated from the specifics of the exact hosts/components that pertain to the logs for a given target. This information can be encapsulated in underlying metadata that is maintained by administrators of the system that understand the correspondence between the applications, hosts, and components in the system.

The next action at block 122 is to capture the log data according to the user configurations. The association between the log rules 111 and the target representations is sent to the customer network 104 for processing. An agent of the log analytics system is present on each of the hosts 109 to collect data from the appropriate logs on the hosts 109.

In some embodiments, data masking may be performed upon the captured data. The masking is performed at collection time, which protects the customer data before it leaves the customer network. For example, various types of information in the collected log data (such as user names and other personal information) may be sensitive enough to be masked before it is sent to the server. Patterns are identified for such data, which can be removed and/or changed to proxy data before it is collected for the server. This allows the data to still be used for analysis purposes, while hiding the sensitive data. Some embodiments permanently remove the sensitive data (e.g., change all such data to "***" symbols), or changed to data that is mapped so that the original data can be recovered.

At block 124, the collected log data is delivered from the customer network 104 to the log analytics system 101. The multiple hosts 109 in the customer network 104 provide the collected data to a smaller number of one or more gateways 108, which then sends the log data to edge services 106 at the log analytics system 101. The edge services 106 receives the collected data one or more customer networks and places the data into an inbound data store for further processing by a log processing pipeline 107.

At block 126, the log processing pipeline 107 performs a series of data processing and analytical operations upon the collected log data, which is described in more detail below. At 128, the processed data is then stored into a data storage device 110. The computer readable storage device 110 comprises any combination of hardware and software that allows for ready access to the data that is located at the computer readable storage device 110. For example, the computer readable storage device 110 could be implemented as computer memory operatively managed by an operating system. The data in the computer readable storage device 110 could also be implemented as database objects, cloud objects, and/or files in a file system. In some embodiments, the processed data is stored within both a text/indexed data store 110 *a* (e.g., as a SOLR cluster) and a raw/historical data store 110 *b* (e.g., as a HDFS cluster).

At block 130, reporting may be performed on the processed data using a reporting mechanism/UI 115. As illustrated in FIG. 2, the reporting UI 200 may include a log search facility 202, one or more dashboards 204, and/or any suitable applications 206 for analyzing/viewing the processed log data. Examples of such reporting components are described in more detail below.

At block 132, incident management may be performed upon the processed data. One or more alert conditions can be configured within log analytics system such that upon the detection of the alert condition, an incident management mechanism 117 provides a notification to a designated set of users of the incident/alert.

At 134, a Corrective Action Engine 119 may perform any necessary actions to be taken within the customer network 104. For example, a log entry may be received that a database system is down. When such a log entry is identified, a possible automated corrective action is to attempt to bring the database system back up. The customer may create a corrective action script to address this situation. A trigger may be performed to run the script to perform the corrective action (e.g., the trigger causes an instruction to be sent to the agent on the customer network to run the script). In an alternative embodiment, the appropriate script for the situation is pushed down from the server to the customer network to be executed. In addition, at 136, any other additional functions and/or actions may be taken as appropriate based at last upon the processed data.

FIG. 3 is an exemplary extracted data log illustrating an array of log records. JSON and XML are both possible file formats. JSON logs can be used to store and maintain data in a human-readable text format. The format consists of attributes and their data types stored in the form of an array. FIG. 3 is an example of a JSON array.

Structured data logs can include common data that can be attached with all log entries extracted from the logs. FIG. 3 illustrates one such example where log datapoints 304 can include an array of log records 306 and metadata 308 can include common data for all records. For example, datapoints 304 can include an array of log records including values for timestamp, value, and count. The structured data log 300 can include additional information (e.g., namespace 310, name 312, and metadata 308) that surrounds the log records without which the log record information would be challenging to be understood meaningfully. The additional information surrounding the log records can be common data that can be applicable for all records. Information about different metrics can be found in different blocks.

Existing parsers may only extract log records independent of each other. For the example illustrated in FIG. 3, existing systems may not attach information around the datapoints 304 array, which can be header data, to the log records 306 extracted from the datapoints 304 array.

A technique to link the log record data with the rest of the log records is to generate a header-details relationship. Using this technique, all detail log records under datapoints 304 array from the example in FIG. 3 can be enriched with the fields extracted from the header fields (e.g., data around datapoints 304 array). This technique can be performed by creating two parsers: one for header and one for details information. Then the user can configure a header-details relationship between the two parsers. Once the relationship is created, the system can add fields from the log records matched by the header parser to all the log records matched by the details parser. The header parser can identify the common fields for extraction and later to be enriched to the log entries identified by the details parser. Once the details log entry is enriched with the common fields (from header log entry), the user can then easily visualize and/or analyze the logs.

The flow for the technique can occur as follows. From all the parsers in the log source, the system can prepare a set of JSON paths to be matched. The system can read the JSON tokens from a JSON file. For each JSON path, the system can match a token to the log record data. If the token is matched, the system can mark a beginning of a matched block of the log files. If the token under processing is inside the matched block, the system can continue to collect tokens. If the matched block ends, the system can store the token text in a collected log text, for this jsonpath, for later processing.

When the complete JSON content is processed the system has all the required header and detail log records in hand. If a new block is started, the system can clear the previously cached header log record. If this log record is matched by a header parser, the system can save it in a cache as a header log record. If there have been any detail log records before it, the system can add the header record before details log records. Otherwise, the system can add it at its current position. If the log record is from a details parser, the system can attach the cached header parser log record, if available, before this log record. If the JSON block is incomplete (e.g., missing closing brackets, etc.) the system can save the needed minimal content to be appended in the next collection cycle. So that the ingested data is properly formatted.

Log messages may have different structure and/or format (e.g., depending on an entity controlling log-message generation, across clients, across software applications used to generate the log messages, across software application used to request the log messages, etc.). Accordingly, select "header" information that may provide information used to enrich log messages may be presented within any of many different portions of log-message data. For example, the information that may provide further context to one or more log-message data points may be in a higher level object (e.g., a root object) or a same-level object, relative to a level of the log-message data points. As an additional or alternative example, the information that may provide further context to one or more log-message data points may be received (in part or in full) before the one or more log-message data points are received and/or after the one or more log-message data points are received. The exemplary log message data shown in FIGS. 4-12 illustrate some of these scenarios and how it is challenging to use predefined and absolute rules to interpret log messages. It will be appreciated that the exemplary log message data shown in FIGS. 4-12 illustrate variability of log-message syntax and that actual log message data may be much more complex and much larger (e.g., extending to be tens of thousands of lines long).

FIG. 4 illustrates a first portion 400 of a first exemplary JSON log. The first portion 400 of the first exemplary JSON log includes first header information 402*a* and corresponding first details information 404*a* and second header information 402*b* and corresponding second details information 404*b*. Existing parsers can be used to ingest log content to generate relative field mappings for field extraction. The first exemplary JSON log configures S/*/datapoints to collect individual data points as log entries.

The first header information 402*a* and first details information 404*a* in top part of FIG. 4 relate to CPU usage, and the second header information 402*b* and second details information 404*b* in the bottom part of FIG. 4 relate to matched cloud events. For example, the first header information 402*a* can include a namespace, compartmentId, name and dimensions. The namespace, compartmentId and/or name may be used to indicate what type of data (e.g., at a multi-variable level and/or record level) for which detail information is being collected and/or permissions to access the data. The dimension data (in this instance) indicates that the metric of interest is CPU usage for a particular resource (ocid1.opsidatabaseinsight.oc1..unique_ID) and particular telemetry source type (Cloudinfrastructure). The first detail information 404*a* includes two consecutive data points, each including a timestamp, a value, and a count. The count is incremented across each data point, such that the count for the first data point is "1" and the count for the second data point is "2". The value for each data point is "0". When the value is assessed in view of the sourceMetricName, it can be understood that the value indicates that there was no CPU usage associated with either of the timestamps/counts.

With respect to the bottom portion of FIG. 4, the second header information 402*b* includes a same compartmentID but a different name and dimension, though the dimension data identifies a same resourceID. For example, the second header information 402*b* includes a namespace and name relating to events/matched events and dimensions that relate to an event rule. Thus, the second details information 404*b* identifies a different type of information that is nonetheless associated with a same resource (where the matching is performed according to a rule). Accordingly, log entries that include select details information may be enriched to include information from a corresponding header, so as to provide meaning and/or context to what select data (e.g., values or counts) represent.

FIG. 5 illustrates a second portion 500 of the first exemplary JSON log. Similar to the first portion 400, the second portion 500 of the first exemplary JSON log can include header information 402*c-e* and details information 404*c-e*. However, the header information 402*c-e* in FIG. 5 is different than the header information 402*a-b* in FIG. 4. For example, the name and the dimensions in each of the header information 402*c-e* in FIG. 5 is different than those from header information 402*a-b* in FIG. 4, which can indicate that information in the details may pertain to a different type of information (e.g., regarding a variable type, association with a resource, source, etc.). As a specific illustration, the header information 402 and details information 404 in FIG. 5 relate to provisioning instances, query latency, and connection latency, as opposed to CPU usage and matched events.

Figure 6:
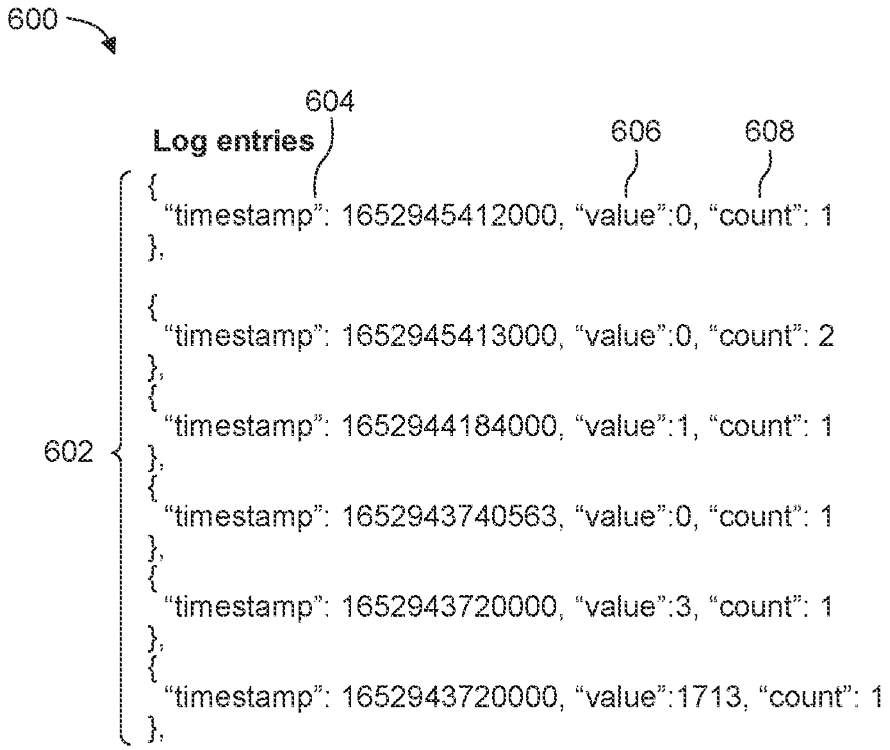
FIG. 6 illustrates exemplary log entries from the first exemplary JSON log.

FIG. 6 illustrates exemplary (non-enriched) log entries 602 from the first exemplary JSON log. As can be seen in FIG. 6, a parser can extract various log entries 602. The log entries 602 includes timestamps 604, values 606, and counts 606. Other information can be extracted depending on the type of log. However, the context for these various log entries 602 is lost by other parsing tools. For example, there is no relationship between timestamps 604, values 606, and counts 606 and CPU usage, matched cloud events, provisioning instances, query latency, and connection latency.

In the above example log content, it would have been possible to extract heterogeneous log data pertaining to each of multiple services, such as OCI Operations Insights, CloudEvent, and InstancePools. This would support service-specific processing, such as performing a normalization or calculating a statistic in a manner corresponding to a specific service or to a specific type of metric. As can be seen above, the system would identify correct log entries 602 by extracting them using a log entry JSON path of $[*].datapoints.

However, the log entries 602 may lose contextual data and be rendered useless. The user would have no means to figure out which log entry was emitted by which service. Thus, the log entries may lose their purpose.

Accordingly, in general, during the processing of structured log data like JSON and XML, there is a need to identify contextual/header log data, which can be in line with the log data being ingested and can provide meaning to the log entries being extracted. This problem cannot be solved with the usual means of log data enrichment using an external data source (e.g., a lookup table) because the header data that provides meaning to data points in the log details is not external to a log record but is instead interspersed with the log entries being extracted.

In some embodiments, a generic framework is provided to support user configuration to indicate log-record structure, so as to identify where contextual/header log data is (e.g., relative to detail information or including more absolute location indications). The contextual/header log data can then be extracted and associated with particular detail information (i.e., one or more particular payloads), and individual log entries can then be enriched with the relevant contextual/header log data. The proposed solution can be implemented by using a Header Detail Parser function. The users can make use of this function to define where—within log-record data—there is contextual/header specifications that provide meaning to detail information. The function can thereby provide a framework to automatically associate particular contextual/header specifications with the relevant log entries during log data ingestion. The framework also seamlessly supports processing of very large files, files being appended, files being rolled over etc., because the framework is configured such that exhaustive and/or continuous searches for contextual/header specifications need not be performed (thereby increasing processing speed, reducing memory usage, and improving the quality of data processing).

Embodiments of the invention are particularly advantageous, given that contextual information may be at many different locations within a log record, any of multiple levels of a log record, and/or even split to be partly before one or more payloads and partly after the one or more payloads. While a traditional approach is detect one or more contextual definitions in a header at a $ level and to then associate the definition(s) with a subsequent payload that exists at a $.foo level, many other log records have different structures, as illustrated across FIGS. 7-13.

FIG. 7 illustrates a second exemplary JSON log 700. In the second exemplary JSON log 700, the header information 702 is at the $ level and the details information 704 is at the $.data level. The header information 702 surrounds the details information 704. Despite part of the header information being presented after the details information 704, in accordance with embodiments of the invention, locations of the header information 702 may be automatically detected that and/or input from a user device can be received to indicate locations of the header information 702. This automatic detection or input can be used to detect details from the header information 702 that both preceded followed the details information 704 and to associate the header information 702 with the detail information 704, so as to generate extracted information 706. This association traditionally was not done, as payloads (i.e., details information) are frequently processed quickly in a manner that does not delay for waiting on additional potential context.

FIG. 8 illustrates a third exemplary JSON log 800. In the third exemplary JSON log 800, the header information 802 and 808 is (at the $, $.dimension and $.metadata levels) and the details information 804 at the $.datapoints[*] level. In this particular case, metadata information 808 follows a first instance of the header information 802 and details information 804 (relating to two different payloads/detail entries), though it is followed by a second instance of the same header information 802 and details information 804.

In accordance with embodiments of the invention, it may be automatically detected that and/or input from a user device can be received to indicate that that contextual/header information is to be identified at a metadata level. This automatic detection or input can be used to detect details from the metadata information 808 (and identify these as header/contextual information) and to associate the metadata information 808 with the detail information 804 and potentially other header information 802, so as to generate extracted information 806. This association traditionally was not done, especially given that the metadata information 808 was provided in addition to and separately from other header information 802.

FIG. 9 illustrates a fourth exemplary JSON log 900. In the fourth exemplary JSON log 900, the header information 902 is at array of objects, where $.instanceHealths:[*] level and the details information 904 are inside the array of objects at the $.instanceHealths:[*].instanceHealthChecks[*] level. In this case, the header information 902 is partly before and partly after the details information 904. There are also multiple objects inside the array. The extracted log data 906 can be shown below the log.

In accordance with embodiments of the invention, it may be automatically detected that and/or input from a user device can be received to indicate that the split in the header/contextual information. This automatic detection or input can be used to detect details from the header information 902 and to associate the header information 902 with the detail information 904 and potentially other header information 902, so as to generate extracted information 906.

FIG. 10 illustrates a fifth exemplary JSON log 1000 that can include multiple headers, spanning across different objects. A first location of header information 1002 is at the $.dimensions level. A second location of header information 1002 is at the $.metadata location. The details information 1004 is at the $.datapoints[*] level.

In accordance with embodiments of the invention, it may be automatically detected that and/or input from a user device can be received to indicate that the multiple headers that span different objects and that bridge the payloads. This automatic detection or input can be used to detect details from the header information 1002 from the different objects and to associate the header information 1002 with the detail information 1004, so as to generate extracted information 1006.

FIG. 11 illustrates a sixth exemplary JSON log 1100. In the sixth exemplary JSON log 1100 both the header information 1102 and the details information 1104 are at the same level ($ level). In this particular case, the field "type" is used to differentiate between content that is to be associated with a header versus detail. However, other differentiation approaches (e.g., using a different field name or syntax) are possible. Accordingly, in some embodiments of the invention, specifications from a user are used to identify a syntax specification that can be used to dissect or isolate portions of the log data and categorize each of one or more portions as being a header portion or a detail portion.

If such specifications are not provided prior to receiving one or more log messages (e.g., that does not include a multi-level structure and/or a multi-level structure that distinguishes header and detail information), a query can be sent to a user device to determine how to identify header information 1102 and how to identify details information 1106. In some instances, such a query is sent before any log data is received.

In this case, the user may indicate That there is a value for “type” that can be used to indicate header information 1102 and details information 1104. For example, “hdr1” can define the type as header information 1102. Once header values are defined they can be applied to all body entries that appear below the header information 1102. The extracted log data 1106 is shown below the log.

FIG. 12 illustrates a seventh exemplary JSON log 1200. In the seventh exemplary JSON log 1200, header information 1202*a* is at $.hdr1, header information 1202*b* is at $.hdr2, detail information 1204*a* and detail information 1204*b* are at $.body. As was the case for the sixth exemplary JSON log 1100 (in FIG. 11), “type” data can then be used to distinguish header portions from body portions. In this particular case, hdr1 (from header information 1202*a*) is inside a root block that is separated from the detail information 1204*a* and 1204*b*, while hdr2 (from header information 1202*b*) is in a same object as detail information 1204*b*. Therefore, hdr1 is not applied to any detail information, whereas hdrd2 is applied to detail information 1204*b*. Extracted log data 1206 shows, accordingly, that fields cached from previous header entries are cleared after receipt of each of the first two blocks is completed.

Figure 13:
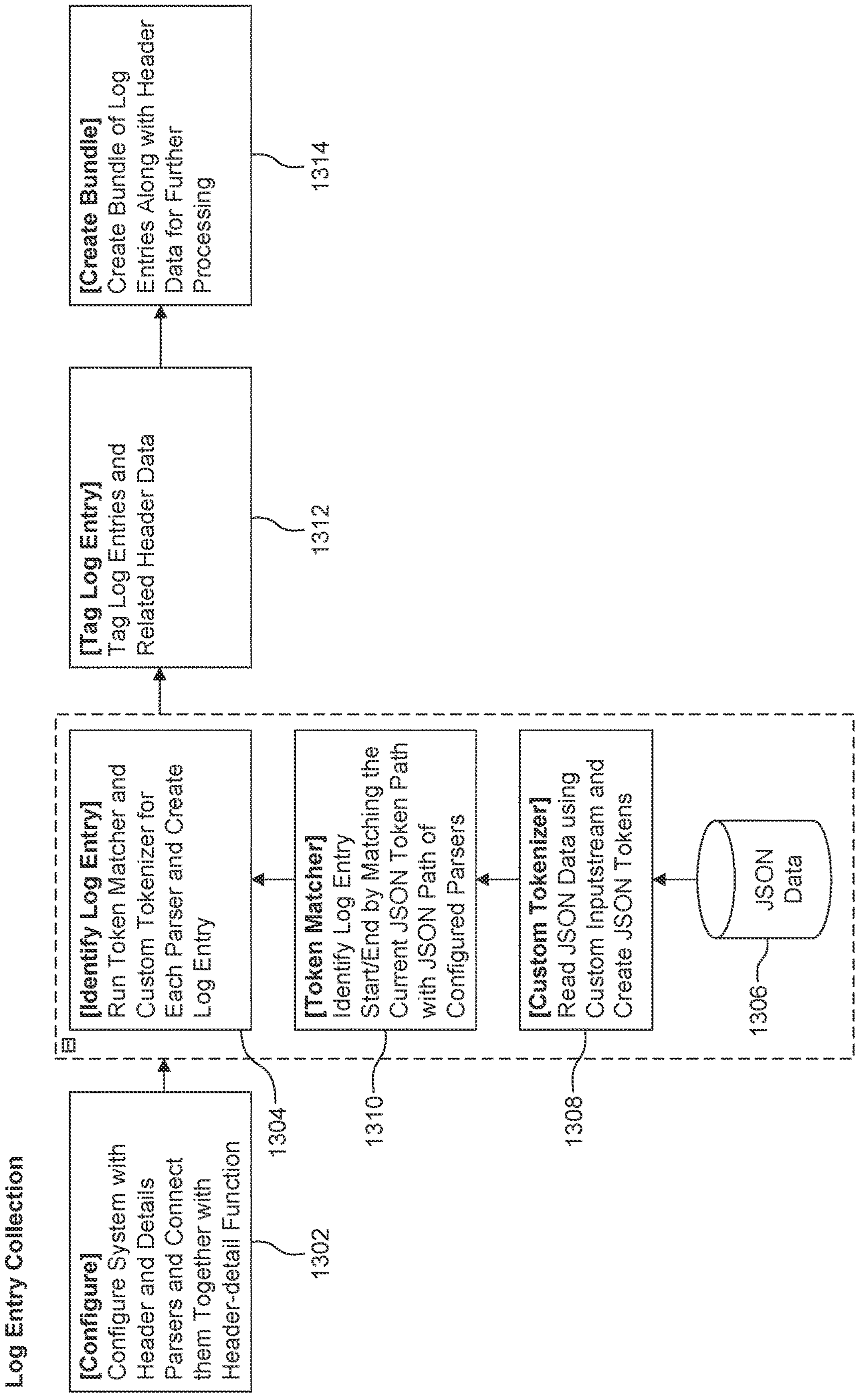
FIG. 13 illustrates an exemplary flow for log entry collection.

FIG. 13 illustrates an exemplary flow for log entry collection. At block 1302, configuration data is defined that specifies a syntax specification for differentiating header information from detail information. This syntax specification may have been defined based on input from a user device (e.g., received in response to an intake query or query sent upon detecting log data not matching a syntax specification previously associated with or defined by a client associated with the user) and/or client information.

Figure 14:
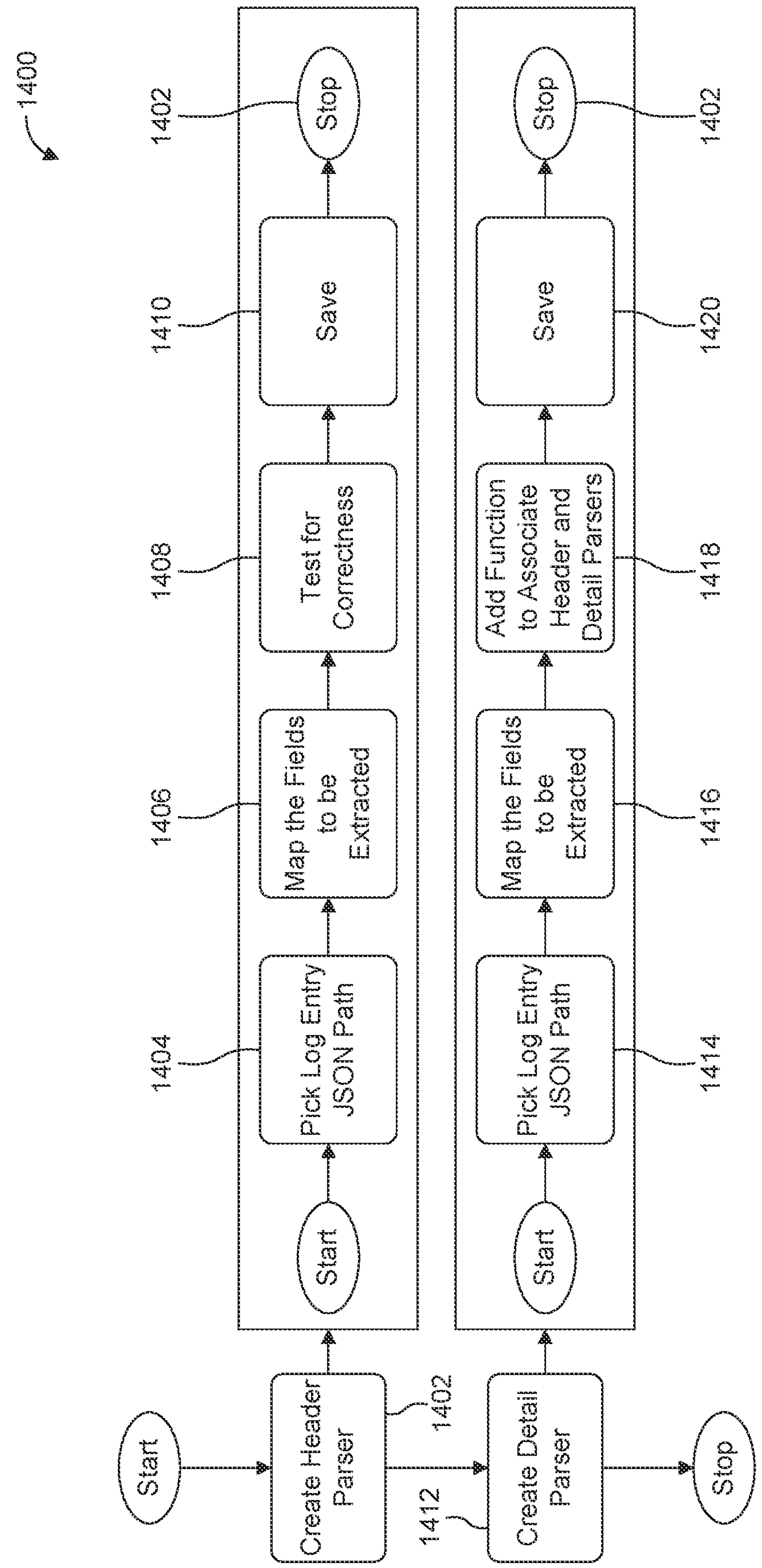
FIG. 14 illustrates an exemplary flow for configuring Header-Detail function.

FIG. 14 illustrates an exemplary flow 1400 for defining configuration data, which can be performed at block 1302 of FIG. 13. The definition of configuration data can include configuring a system with a header-detail function that creates a relation between header and detail parsers. At block 1402, a header parser is created. Creating the header parser can include performing actions from blocks 1404-1410. At block 1404, a particular path can be defined to be associated with a header. The path may include (for example) a path to a root level (e.g., $ level) or a given sub-level (e.g., a $foo level). In some instances, the path may include an identification of a particular level (or sub-level) and a given syntax specification (e.g., keyword or key-value pair). At block 1406, fields to be extracted are mapped to particular parts of the log entry. For example, stored data (e.g., that may have been identified by a given user or client) may identify particular header fields for which values are of interest or potentially of interest. The fields may be mapped by (for example) finding an exact match (or a match of at least a predefined degree) for a particular header field for which stored data indicated that values were of interest or potentially of interest. In some instances, at block 1408, a test is performed to estimate or determine whether the mapped fields and/or identified path correctly correspond to header data of interest. For example, select log data, along with a log entry identified at block 1404 and fields mapped at block 1406 may be output to a user device, and feedback received from the user device may indicate with the log entry is a header log entry and/or whether the field(s) identified at block 1406 correspond to field(s) for which values are to be extracted. As another example, one or more assessments may be performed to determine the extent to which log entries predicted to have header information have consistent structure, size, etc. relative to each other, and/or the extent to which values corresponding to the fields to be extracted are consistent with each other (for each of one or more individual fields) across log entries.

At block 1412, a detail parser is created. Creating the detail parser can include performing actions from blocks 1414-1420. At block 1414, a particular path can be defined to be associated with detail information (or a payload). The path may include (for example) a path to a root level (e.g., $ level) or a given sub-level (e.g., a $.foo level). In some instances, a path used for the detail points to a level that is the same as a level identified in a path used for the header parser. In some instances, a path used for the detail points to a level that is different than a level identified in a path used for the header parser. In some instances, the path used for the detail parser may include an identification of a particular level (or sub-level) and a given syntax specification (e.g., keyword or key-value pair). At block 1416, fields to be extracted are mapped to particular parts of the log entry. For example, stored data (e.g., that may have been identified by a given user or client) may identify particular detail fields for which values are of interest or potentially of interest. The fields may be mapped by (for example) finding an exact match (or a match of at least a predefined degree) for a particular header field for which stored data indicated that values were of interest or potentially of interest. At least one of the fields to be extracted by the detail parser may be different than each field to be extracted by the header parser, and/or at least one of the fields to be extracted by the header parser may be different than each field to be extracted by the detail parser.

At block 1418, a function is added to associate the header and detail parsers. The function may include using a caching technique to, upon detecting a header and extracting and mapping header fields, caching the extracted and mapped field values for until a header-cache-clearing condition is satisfied. For example, the header-cache-clearing condition may be configured to be satisfied when an object or a block is closed (e.g., via a “}” character, a “]” character, a single quote character, or a double quote character), when log data has moved to a particular higher level (a level associated with header information), when a particular syntax specification (e.g., keyword or field value) is detected (e.g., that indicates that a new header log entry is beginning, that indicates that association with a previous header log entry is to end, etc.). When there is header data in a cache, the function can be configured to enrich detail information with the cached header information. At block 1420, the detail path identified at block 1414, the identification of fields to be extracted (mapped at 1416), and the function identified at block 1418 can be saved.

Figure 15:
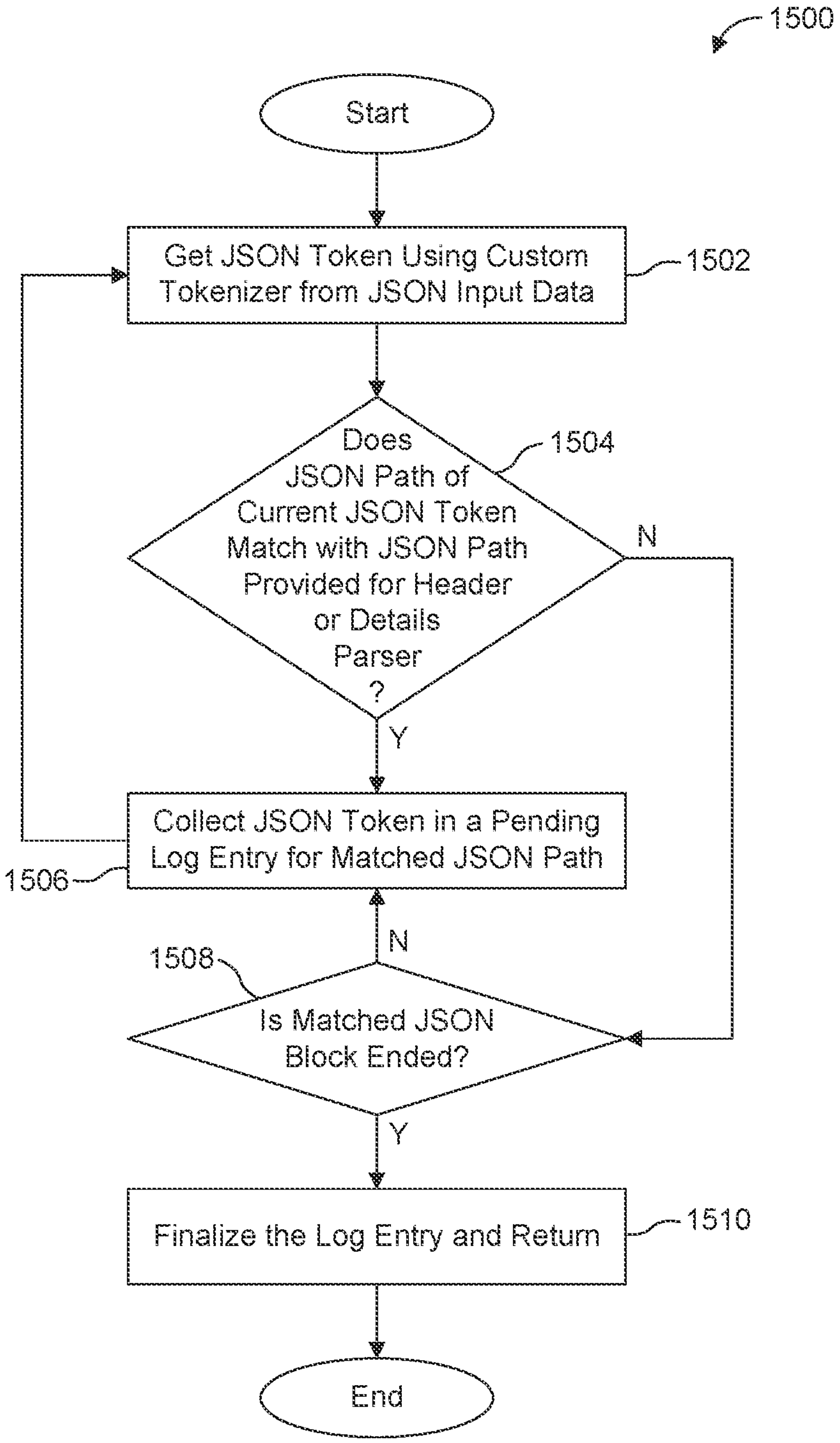
FIG. 15 illustrates an exemplary flow for log entry identification.
Figure 16:
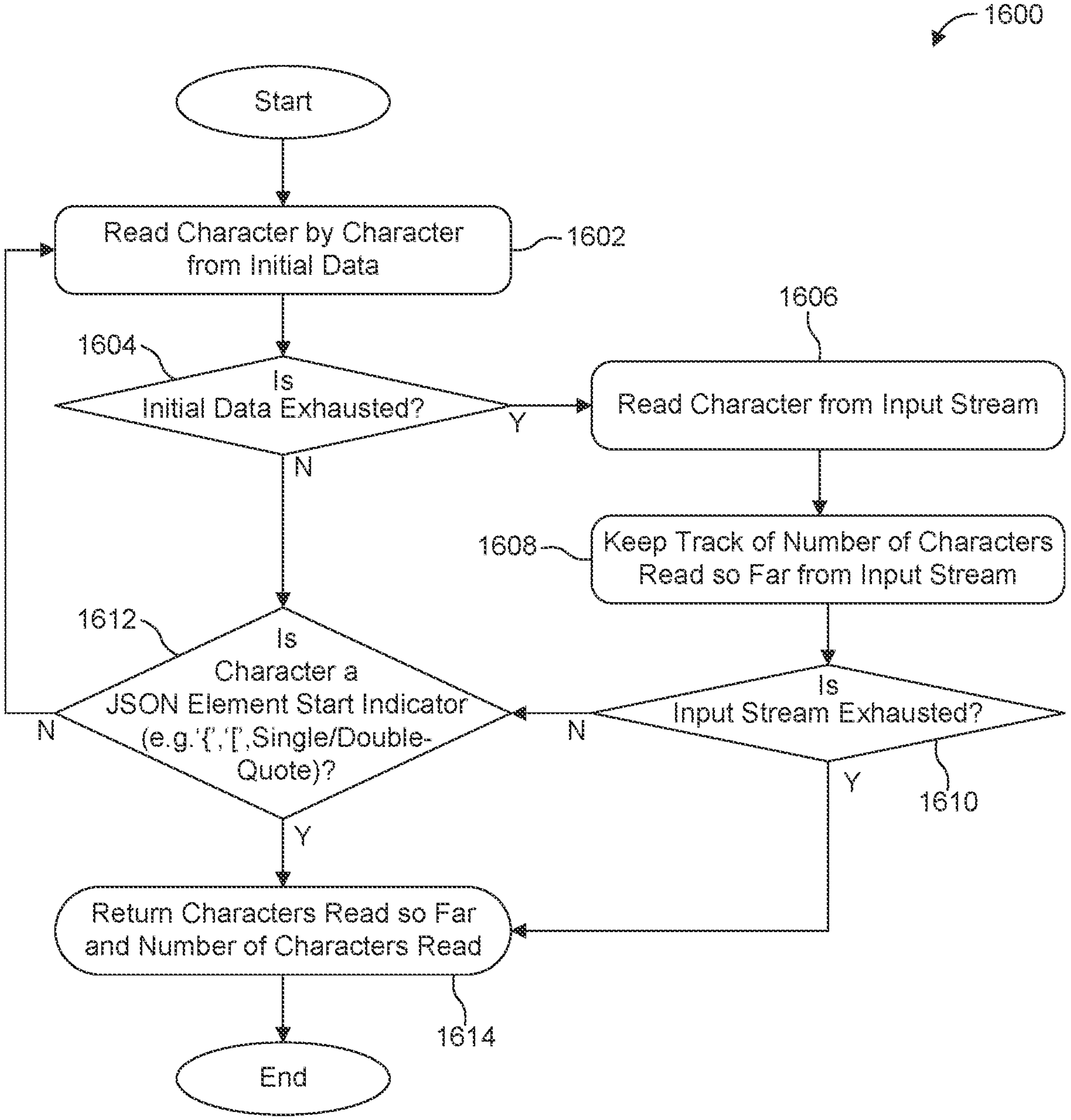
FIG. 16 illustrates an exemplary flow for detecting tokens within an input stream.
Figure 17:
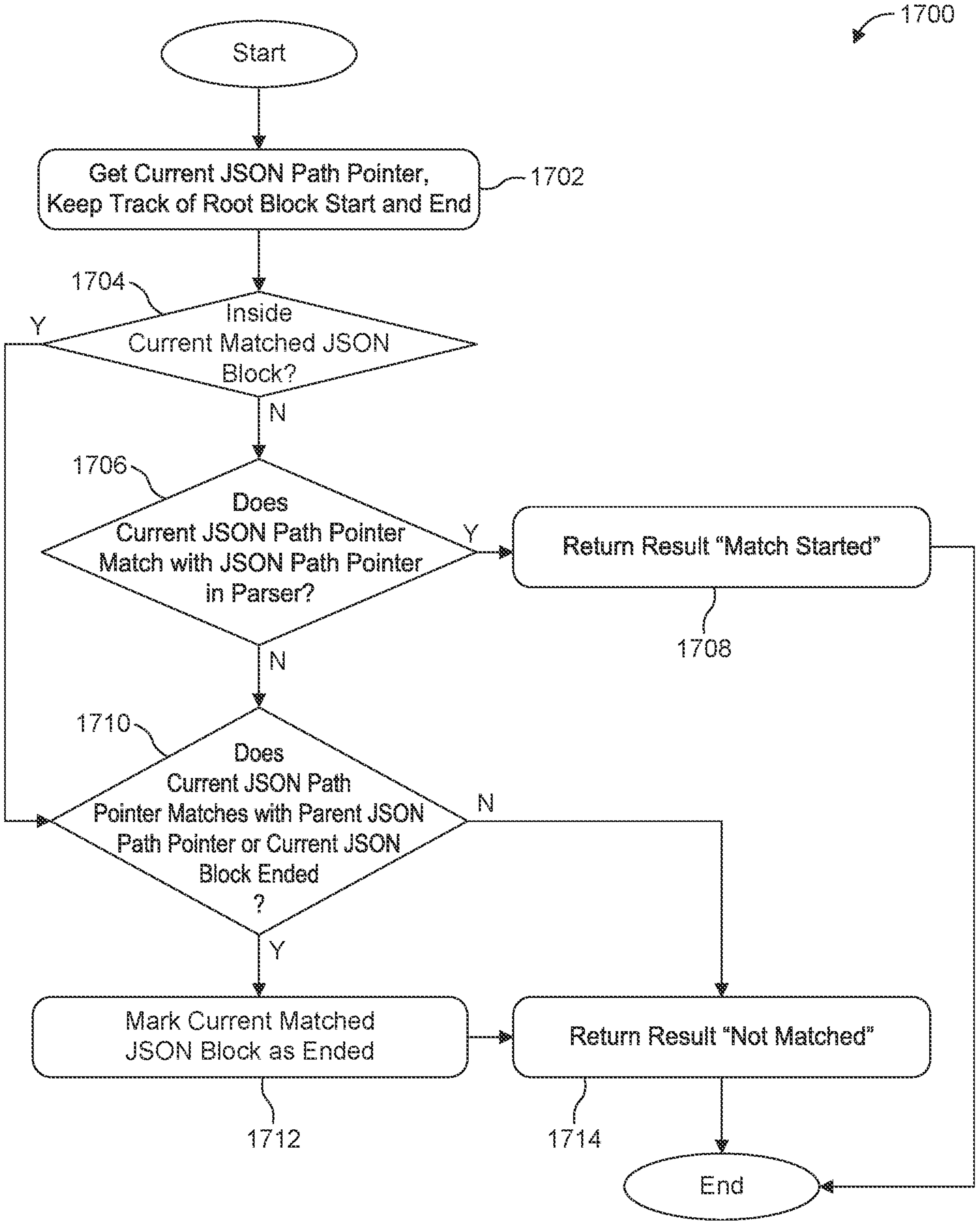
FIG. 17 illustrates an exemplary flow for token matching.

At block 1304, a log entry is identified. FIGS. 15-17 illustrate exemplary flows 1500, 1600 and 1700 for detecting tokens and matching tokens using token parsers, so as to identify particular types of log entries. In general, tokens can be parsed from log data and matched with specific paths identified for each of the header parser and detail parser (as identified at blocks 1404 and 1414 in flow 1400), and a log entry can be created from the matched block in the log data.

FIG. 15 illustrates an exemplary flow 1500 for log entry identification. At block 1502, a JSON token is identified using a custom tokenizer. The token can be identified by processing incoming data (e.g., JSON data) 1306 using a custom tokenizer. The custom tokenizer can be configured to interact with another parser (e.g., a parser configured based on Jackson Streaming API/FasterXML Jackson-core, available at https://github.com/FasterXML/jackson-core, which is hereby incorporated by reference in its entirety for all purposes), such as by customizing an input stream passed to the other parser so as to control an amount of text read and track text that is being or has been read, which can enable resuming reading log data from a current offset. The custom tokenizer can also or alternatively be configured to skip data in a flexible manner, which can support skipping a log block with a syntax error to proceed to processing a next block. The custom tokenizer can also or alternatively support parsing of incomplete blocks, which can support reading from a file which is being appended with new blocks across multiple reading cycles. The custom tokenizer can also or alternatively be configured to receive initial content (e.g., text) to be prepended to input log data, which can support resuming log-data parsing for newly appended blocks. The custom tokenizer can be configured to work in conjunction with another parser, such as the Jackson JSON parser, and the custom tokenizer may be configured to control how data is being read and/or processed by the other parser. A custom tokenizer, as provided in accordance with some embodiments disclosed herein, addresses many disadvantages associated with existing parsers, such as: existing parsers being configured such that: (1) complete data may be read before identifying a first token/JSON element; (2) an incomplete block (e.g., JSON block) cannot be processed; (3) skipping forward to a next block is not possible; and (4) text cannot be inserted before an input stream.

FIG. 16 illustrates an exemplary flow 1600 for detecting tokens within an input stream, which can be performed by the custom tokenizer. Part or all of flow 1600 can be performed as part of block 1308 in flow 1300 and/or as part of block 1502 in flow 1500. Process 1600 starts at block 1602, where input data is read character-by-character. At block 1604, it is determined whether initial data is exhausted. If not, flow 1600 proceeds to 1606, where another character is read from an input stream, and at block 1608, a number of characters read from the input stream is tracked. At block 1610, it is determined whether the input stream has been exhausted. If it is determined that the input stream has not been exhausted, flow 1600 proceeds to block 1612, which is also where flow 1600 proceeds if it is determined at block 1604 that the initial data has not been exhausted. At block 1612, it is determined whether a character in the input is an element that has been defined to be a start indicator for a block or object (e.g., a "{", "[", single quote, or double quote character). If not, flow 1600 returns to block 1602 to read the next character. If so, flow 1600 proceeds to block 1614, where characters read so far (and a number of characters are returned for further processing.

The further processing can include token matching, which can be performed at block 1310 of flow 1300. The token matching can include identifying a start and/or end of a log entry by matching a current token path with a path of a configured parser. For example, JSON Path Pointer can be used to identify log entries in JSON data, and a Token Matcher can be called for each JSON token parsed from JSON data. The Token Matcher can be configured to return "true" when a current path matches with any of the paths associated with the header parser or detail parser. The Token Matcher can further track block starts and ends and return this information along with match status.

Returning to flow 1500, at block 1504, it is determined whether the path of the token matches a path associated with a header parser (e.g., a path identified at block 1404 in process flow 1400) or a path associated with a detail parser (e.g., a path identified at block 1414 in process flow 1400). If either match is detected, flow 1500 proceeds to block 1506, where the token is collected in a pending (e.g., open) log entry for the matched path, and process 1500 then returns to block 1502 to continue processing the input data. If no match is detected at block 1504, flow 1500 proceeds to block 1508, where it is determined whether a block (or object) within the input data has ended. For example, it may be determined that a block has ended upon detecting one or more particular characters (e.g., a "}" character, a "]" character, a single-quote character, or a double-quote character), a change to a particular higher level (a level associated with header information. If it is determined that the block has not ended, flow 1500 proceeds to block 1506, where the token is collected. If it is determined that the block has not ended, flow 1500 proceeds to block 1510, where the log entry is finalized and returned for further processing and/or saving.

FIG. 17 illustrates an exemplary flow 1700 for token matching. Part or all of flow 1700 may be performed at block 1310 of flow 1300. Flow 1700 starts at block 1702, where a path pointer of a current path is identified, and the root block is tracked. The tracking may include detecting any instance where a start of a block has been detected but no corresponding end of the block has been detected, such that the block is open for additional data. At block 1704, it is determined whether a current position within log data is inside a current matched (e.g., open) block. If not, flow 1704 proceeds to block 1706, where it is determined whether a current path pointer matches with a path pointer defined for a header parser or detail parser. If such a path-pointer match is detected, flow 1700 proceeds to block 1708, where a match is started, and a result indicating that a match is started is returned (e.g., such that it can be considered and/or used for identifying and/or defining tokens to be included in a log entry). If such a path-pointer match is not detected, flow 1700 proceeds to block 1710, where it is determined whether a current path pointer matches a path pointer of a parent block or whether it has been determined that a current block has ended. Flow 1700 also proceeds to block 1710 when it is determined (at block 1704) that a current position within log data is inside a current matched block. If (at block 1710) it is determined that a current path pointer matches a path pointer of a parent block or it is determined that a current block has ended, flow 1700 proceeds to block 1712, where a current matched block is marked as ended (thereby closing the block). In either case, at block 1714, the token is identified as not being matched, and a "no match" result is returned.

Figure 18:
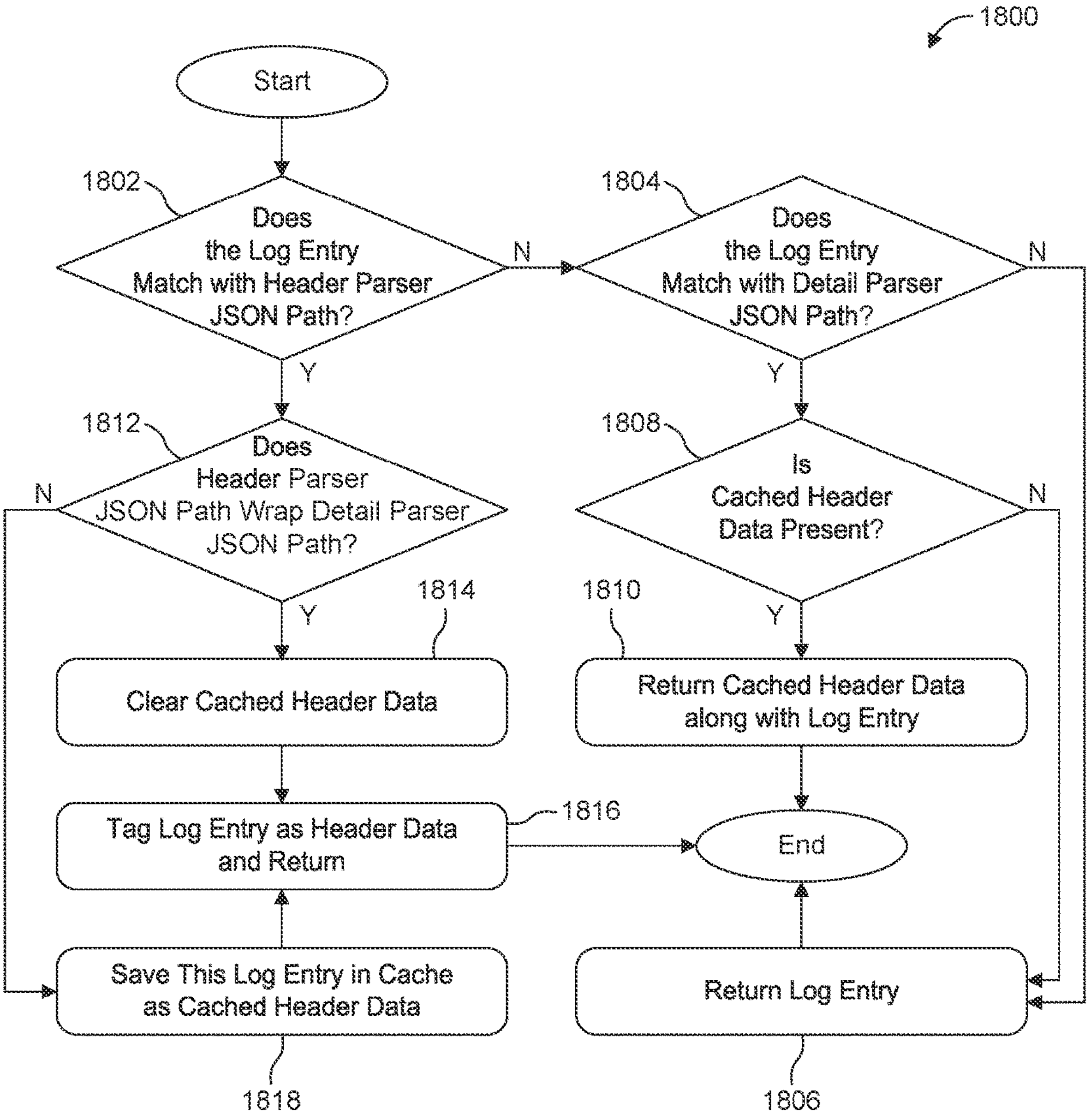
FIG. 18 illustrates an exemplary flow for customizing and tagging log entries.

Returning to flow 1300 (depicted in FIG. 13), at block 1312, the identified log entry and associated header data is tagged as being a detail/body log message and as being related to specific header data. The tagging can be based on information in a Header-Detail function. FIG. 18 illustrates an exemplary flow 1800 for customizing and tagging log entries. Block 1314 of flow 1300 may include part or all of flow 1800. Flow 1800 begins at block 1802, where it is determined whether a path of the log entry matches a Header Parser path. For example, the determination may be based on a level or syntax specification of the log entry matches a level or syntax specification as defined for the header parser. If it is determined that the log entry path does not match a path defined for the header parser, flow 1800 proceeds to block 1804, where it is determined whether the path of the log entry matches a Detail Parser path. For example, the determination may be based on a level or syntax specification of the log entry matches that from a path defined for the detail parser. If it is determined that the log entry path does not match a path defined for the detail parser, flow 1800 proceeds to block 1806, where the log entry is returned. Block 1806 may include returning an untagged log entry and/or returning a result indicating that the log entry does not correspond to a log entry that is to be enriched in accordance with the Header-Detail function.

If it is determined at block 1804 that the log entry matches a Detail Parser path, flow 1800 continues to block 1808, where it is determined whether cached header data is present. If it is not determined that the log entry matches a Detail Parser path, flow 1800 proceeds to block 1810, where cached header data along with the log entry is returned. The cached header data may provide context or meaning to data within the log entry.

If, at block 1802, it is determined that a path of a log entry matches a Header Parser path, flow 1800 proceeds to block 1812, where it is determined whether a header parser path is wrapping a path identified by the Detail Parser. If so, this can indicate that header information corresponding to the header parser path specifically corresponds to the detail information that is wrapped within the log entry. Accordingly, flow 1800 proceeds to block 1814, where the cached header data is cleared, given that it would not be applicable to other detail information. Then, at block 1816, the log entry is tagged as being header data and returned. Meanwhile, if it is determined at block 1812 that the header parser path does not wrap a Detail-Parser path, flow 1800 proceeds to block 1818, where the log entry is saved in cache as cached header data (e.g., because it may then be used to enrich subsequent log entries with other detail information.

Figure 19:
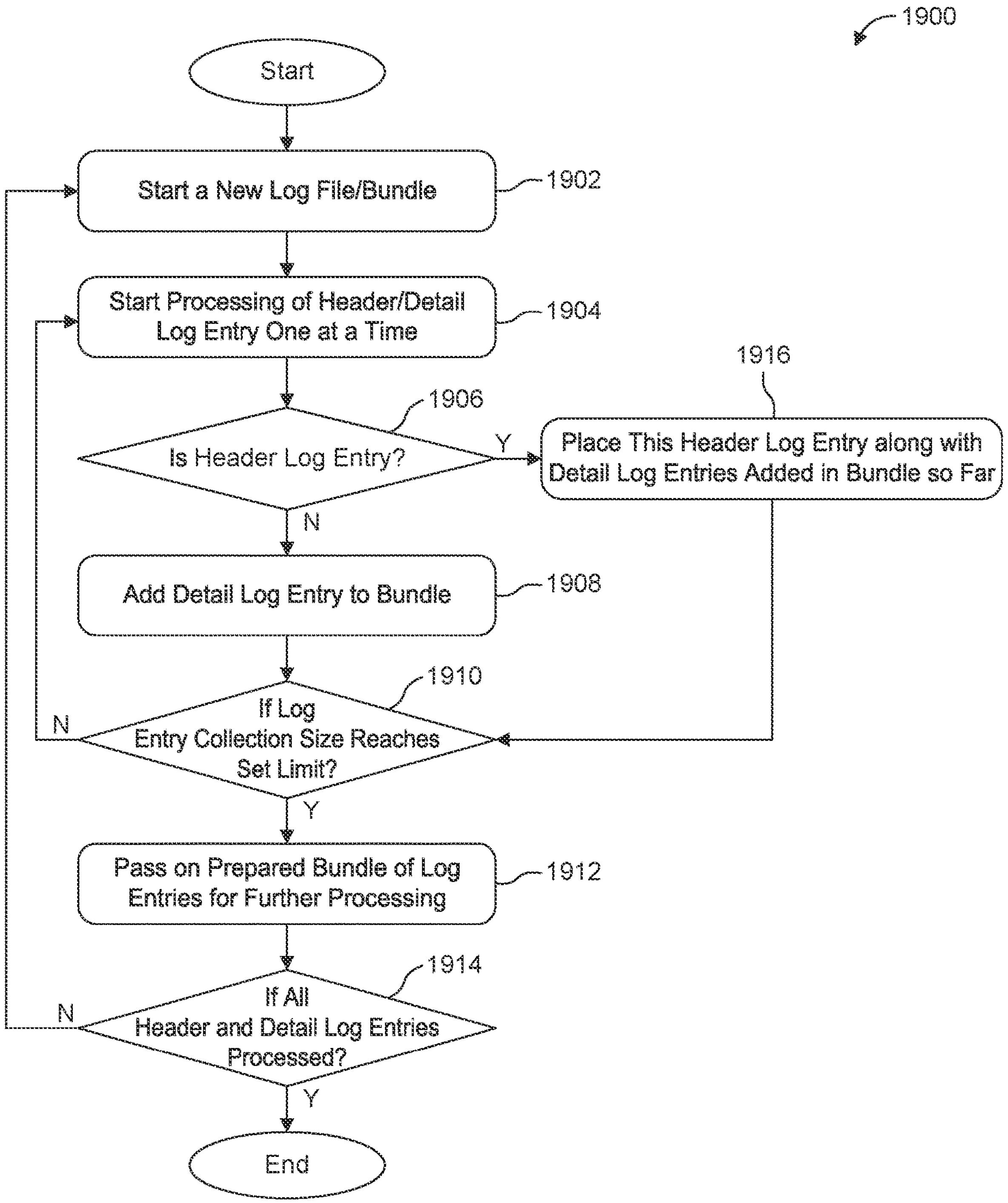
FIG. 19 illustrates an exemplary flow for processing a bundle of log entries.

At block 1314, a bundle of log entries is created along with header data for further processing. For example, the bundle may include all log entries with detail information that have been tagged so as to be associated with the same header data. FIG. 19 illustrates an exemplary flow 1900 for processing a bundle of log entries. Part or all of flow 1900 may be performed at block 1314 of flow 1300. Flow 1900 begins at block 1902, where a new log file or bundle is started. At block 1904, processing of log-entry data is begun, where log entries are processed individually. For each log entry, at block 1906, it is determined whether the log entry is a header log entry. This may be determined by (for example) comparing a path of the log entry, one or more syntax specifications of the log entry, one or more keywords in the log entry and/or one or more key-value pairs in the log entry to reference header information (e.g., that indicates a path, a syntax specification, a keyword or a key-value pair that defines a header entry).

If it is determined (at block 1906) that the log entry is not a header log entry, flow 1900 proceeds to block 1908, where the log entry is added to the bundle. The log entry may be deemed to be a detail log entry in response to the determination, at block 1906, that the log entry was not a header entry. In some instances, block 1908 includes adding the log entry to an initiated (but empty) bundle. In some instances, block 1908 includes initiating a bundle and adding the log entry to the new bundle. In some instances, block 1908 includes adding the log entry to a bundle that already includes one or more other log entries.

At block 1910, it is determined if the log entry collection (i.e., bundle) has reached a particular size limit. The size limit may include a particular data size, particular number of characters, particular number of variable definitions, etc. If it is determined that the limit is not reached, flow 1900 returns to block 1904. If it is determined that the size limit is reached, flow 1900 proceeds to block 1912, where the bundle of log entries is closed and availed for further processing. Then at block 1914, it is determined whether all of the log entries (e.g., that have been identified as having detail or header information) have been processed. If not, flow 1900 returns to block 1902 to process a new log file. If so, flow 1900 ends.

If, at block 1906, it is determined that a log entry is a header log entry, flow 1900 proceeds to block 1916, where the header log entry is associated with one or more corresponding detail-information log entries previously added to the bundle, and the size of the pending collection is then assessed at block 1910.

Thus, flow 1300 provides an approach for reliably detecting and interpreting log entries in a manner that accounts for the potential variability across syntaxes of log entries, levels of log entries (with detail information), levels of header information, and/or keyword indicators of information type. This approach facilities efficient and flexible log-data processing. For example, rather than requiring that each of many detail log entries include complete context data, header information can instead provide this context data for many detail log entries. Further, embodiments disclosed herein support a flexibility or relative positioning and levels of header information relative to detail information, which may allow individual clients to provide header information in a manner that is compatible with data retrieval, relative time of data availability and/or data entry that is supported by their individual workflow, systems, and/or objectives.

Some embodiments of the present invention relate to big data handling. Big data handling may include processing log entries in batches, where each batch is created based on a limit on a number of log entries or a total size of log entries to be included in a bundle or collection cycle. This may lead to various different scenarios as to whether a bundle includes header data and/or where any header data may be within a bundle.

In a first scenario, a bundle includes multiple log entries with detail information and header data, where the total size of the log entries and header data comply with the size requirements. In these instances, the header data and a current offset of input data can be stored in a cache. The header data can then be attached to log entries in the bundle, and each log entry and attached header data can be processed. For a next log entry (with different detail information) in the bundle, the same block can be read from the cached offset onward. For each detected log entry, the cached header data can be attached to the log entry to enrich the log entry, and processing of the enriched log entry can be performed.

In a second scenario, a bundle includes multiple log entries with detail information and header data at the end of the bundle. In this case, a size of the detail log entries may hit a specified size limit before the header data is found in the block. To address this scenario, log entries from previously collected blocks can be processed, and the current offset can be saved in a cache. The input data can be continuously read until header data is detected, at which point the header data can be stored in a cache. The input data can then be re-read from the cached offset, and the cached header data can be attached to log entries that are then being re-read, so as to generate enriched log messages.

In a third scenario, a bundle includes multiple log entries with detail information but no header information. To address this scenario, log entries from previously collected blocks can be processed, and the offset of a current offset can be saved in a cache. The input data can be continuously read until the end of the input data is reached. Upon detecting that the entire block has been read and no header data has been detected, the input data is re-read from the cached offset, and log entries that are detected in the block are processed without header data.

In some embodiments, log data are enriched. For example, a log entry with detail information may be enriched using corresponding header data. During every iteration, a collection of log entries are processed. Every log entry being processed is categorized as a header log entry or not based on a header tag marked. If the log entry is a header log entry, the relevant fields are extracted and cached. If the log entry is not a header log entry, it is processed using the Detail Parser. The detail fields extracted are enriched with the header fields, when such header fields are available in the cache. If there are no header fields in the cache, this may indicate that a header log entry is not available as yet. Once the header log entry is identified and its fields extracted and cached, the subsequent detail log entries would be enriched with the cached header fields. During the course of log data ingestion, if the header log entry is updated, the cached header fields would be updated as well. All the subsequent detail log entries would then be enriched with the updated header fields.

Figure 20:
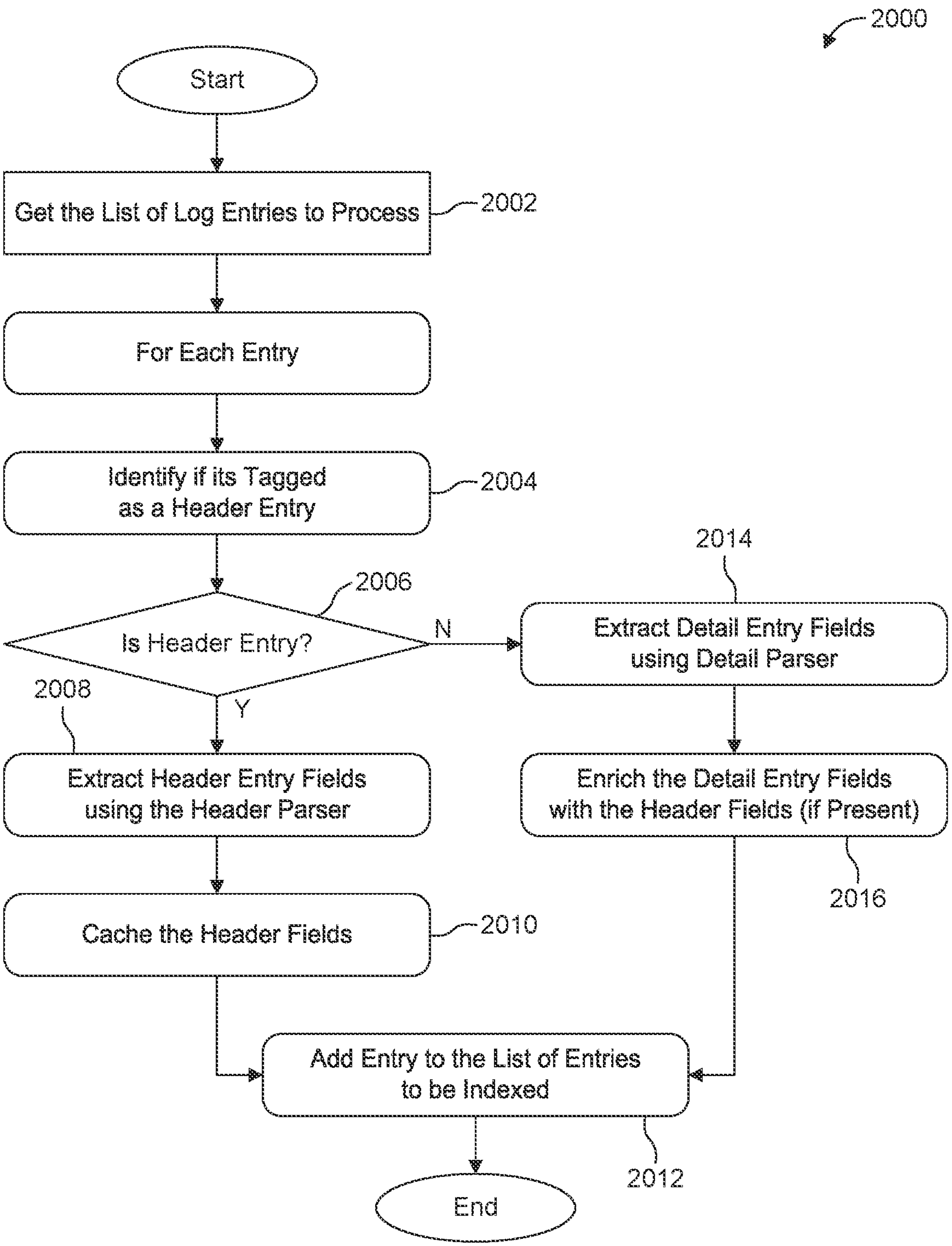
FIG. 20 illustrates an exemplary flow for enriching detail fields.

FIG. 20 illustrates an exemplary flow 2000 for enriching detail fields. Flow 2000 begins at block 2002, where a list of log entries to be processed is identified. The list need not include specific details about each log entry but can instead include sufficiently specific information so as to indicate where each of the log entries to be processed can be accessed. For example, even identifying an identifier of a bundle that includes the log entries may be sufficient.

For each log entry, it is determined at blocks 2004 and 2006 whether the log entry is tagged as being a header entry. If so, flow 2000 proceeds to block 2008, where header entry fields are extracted from the log entry using the header parser. The header fields and/or field values are then cached at block 2010, and—at block 2012—the log entry is added to a list of entries to be indexed. If it is determined that the log entry is not a header entry, flow 2000 proceeds from block 2006 to block 2014, where detail entry is extracted from the log entry using the detail parser. Then, at block 2016, the detail entry is enriched with any header fields and/or field values that are present in the cache. The (now enriched) entry is then added to the list of entries to be indexed at block 2012.

Figure 21:
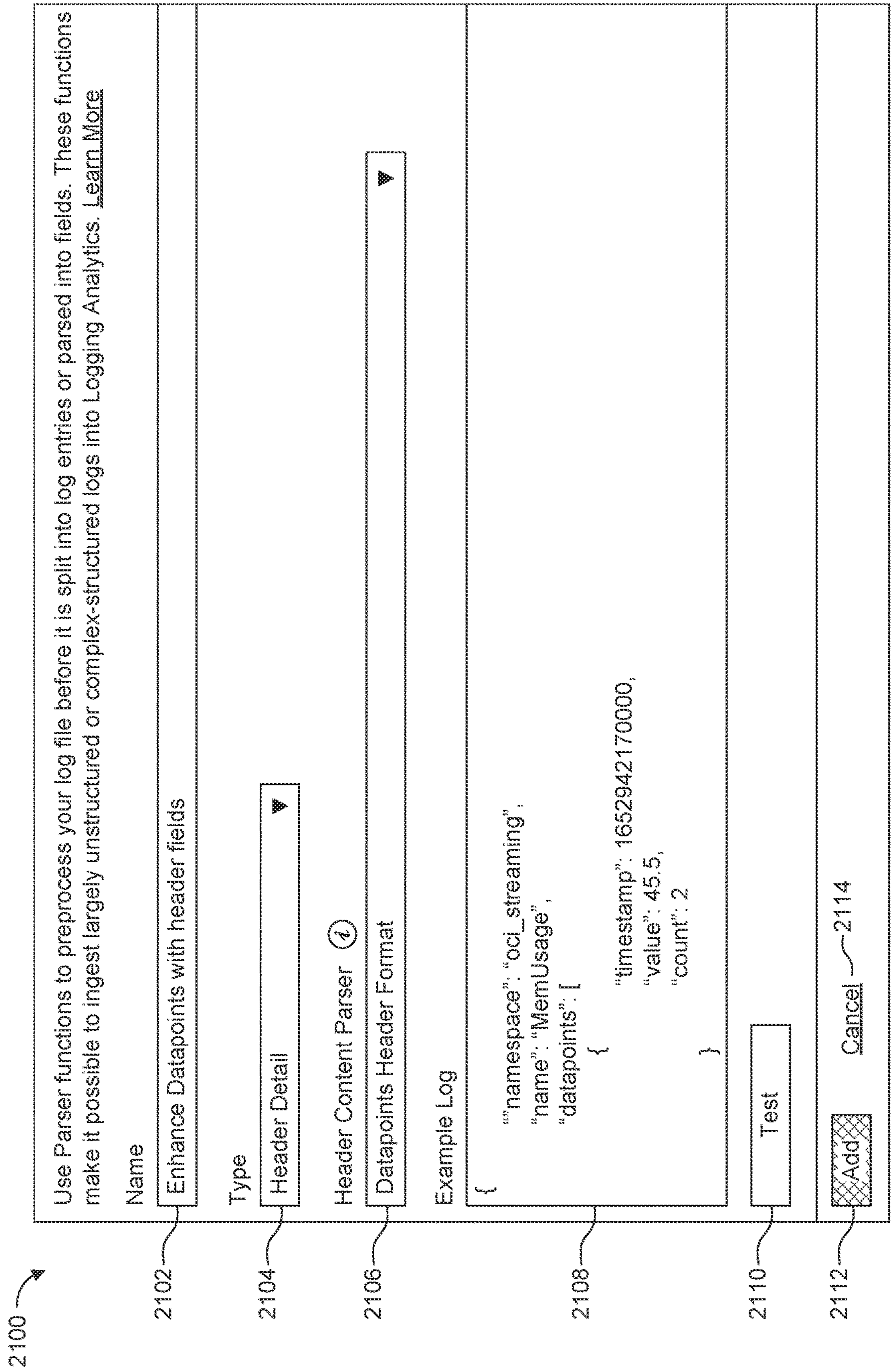
FIG. 21 illustrates an exemplary add function user interface.

FIG. 21 illustrates an exemplary add function user interface 2100. The system can use parser functions to preprocess log files before being split into log entries or parsed into log fields. These function can make it possible to ingest largely unstructured or complex-structured logs into logging analytics.

For example, the user interface 2100 can receive a first input 2102 from a user. The first input 2102 can be a name of the parser function. In the example illustrated in FIG. 21, the first input 2102 is "Enhance Datapoints with header fields."

The user interface 2100 can receive a second input 2104 from the user. The second input 2104 can select a header content parser from a drop down menu. In the example illustrated in FIG. 21, the second input is "Datapoints Header Format."

The user interface 2100 can receive a third input 2106 from the user. The third input 2106 can be an exemplary log. The system can determine a log structure from the exemplary log.

The user interface 2100 can include a test button 2110. The test button 2110 allows for testing the function before it is added to the logging analytics parser.

The user interface 2100 can include an Add button 2112. The Add button 2112 can add the function to the logging analytics routine. A cancel button 2114 would not add the function to the logging analytics routine.

FIG. 22 is a first exemplary function test output page 2200. As discussed above, a log file can include a header log entry and body log entries. The header detail function can use the header log entry to enrich the body log entry. The page 2200 can illustrate a match status 2204 for fields extracted from the various arrays (e.g., "namespace", "oci_streaming", "name", "MemUsage", "datapoints", etc.) from the structured log.

For example, for the original content of the various arrays 2206, (e.g., "namespace", "oci_streaming", "name", "MemUsage", "datapoints", etc.) the system can extract the following fields 2208 (e.g., Display Name=Memory Usage, Unit=percentage, and Name=MemUsage") using the header content parser. Fields in purple highlighting are extracted using the details parser. Fields in amber highlighting are extracted with the header content parser.

For the log values 2210 of "timestamp". "value," and "count" for the following fields 2208 (e.g., Display Name=Memory Usage, Unit=percentage, and Name=MemUsage") using the header content parser the parser can extract the detail fields information 2212 (e.g., "count=2"; "time=2022-05-19T06:36 10.000Z", and "value=45.5."

The add button 2212 can be selected to add the function. The cancel button 2214 can exit this page without adding the function.

Figure 23:
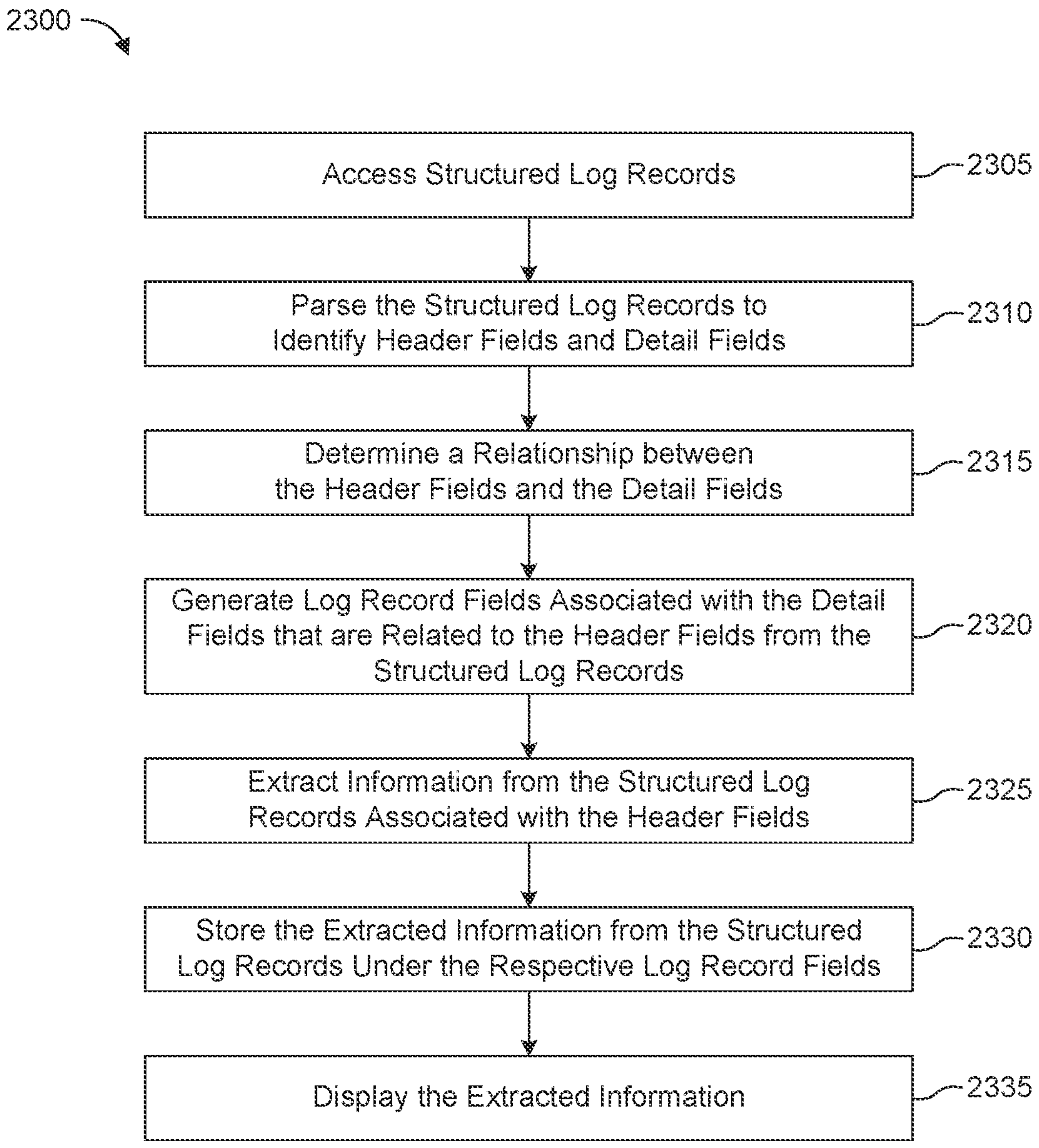
FIG. 23 is a flow diagram for a technique for enriching data logs.

FIG. 23 is a flow chart of a process 2300, according to an example of the present disclosure. According to an example, one or more process blocks of FIG. 23 may be performed by one or more processors of a computing device.

At block 2305, process 2300 may include accessing structured log records of a computing system. For example, computing device may access structured log records stored in a memory of the computing device, as described above. In various embodiments, the location of the structured log records may be indicated by a user through a user interface.

At block 2310, process 2300 may include parsing the structured log records to identify header fields and detail fields. For example, computing device may parse the structured log records to identify header fields and detail fields, as described above. In various embodiments, one or more parsing routines can be applied to the structured data using a log analytics system as described above. In various embodiments, the header fields and detail fields can be stored in a log file. The log file can be stored in the memory of the computing system At block 2315, process 2300 may include determining a relationship between the header fields and the detail fields. For example, computing device may determine a relationship between the header fields and the detail fields, as described above. In various embodiments, a user may identify the relationship via entry in a user interface.

In various embodiments, the determining the relationship between the header fields and detail fields can include receiving a selection of one or more structured format tokens. The determining the relationship can include parsing the structured log records for the selected structured format tokens. When the selected structured format tokens are located within the structured log records, the determining the relationship can include marking a beginning of a matched block of the structured log records; storing the selected structured format tokens within a collected text log; and matching an end of the matched block of the structure log records.

When information in the collected text log matches one of the header fields from a header parser, process 2300 can include storing the information in a cache as a header log record. Process 2300 can include determining a first location of detailed log records and a second location the header log record in the structured log records. Process 2300 can include adding the header log record prior to the second location of the header log record when the detailed log records appear prior to the header log record.

When information in the collected text log matches one of the header fields from a header parser, the process 2300 can include storing the information in a cache as a header log record. Process 2300 can include attaching the cached header log record prior to the collected text log.

In various embodiments, process 2300 can include saving incomplete information from the one or more selected structured format tokens when the information is missing or incomplete. Process 2300 can include appending the incomplete information in the collected text log during a next collection cycle.

In various embodiments, the structured format tokens comprise JSON tokens. In various embodiments, the structured format tokens comprise XML tokens.

At block 2320, process 2300 may include generating log record fields associated with the detail fields that are related to the header fields from the structured log records. For example, computing device may generate log record fields associated with the detail fields that are related to the header fields from the structured log records, as described above. In various embodiments the log record fields can be stored in a memory of the computing system.

At block 2325, process 2300 may include extracting information from the structured log records associated with the header fields. For example, computing device may extract information from the structured log records associated with the header fields, as described above. In various embodiments, a log analytics routine can be used to extract the information.

At block 2330, process 2300 may include storing the extracted information from the structured log records under the respective log record fields. For example, computing device may store the extracted information from the structured log records under the respective log record fields, as described above. In various embodiments, the extracted information can be stored in the memory of the computing device.

At block 2335, process 2300 may include displaying the extracted information. For example, computing device may display the extracted information, as described above. In various embodiments, the extracted information can be displayed for analysis.

It should be noted that while FIG. 23 shows example blocks of process 2300, in some implementations, process 2300 may include additional blocks, fewer blocks, different blocks, or differently arranged blocks than those depicted in FIG. 23. Additionally, or alternatively, two or more of the blocks of process 2300 may be performed in parallel.

Figure 24:
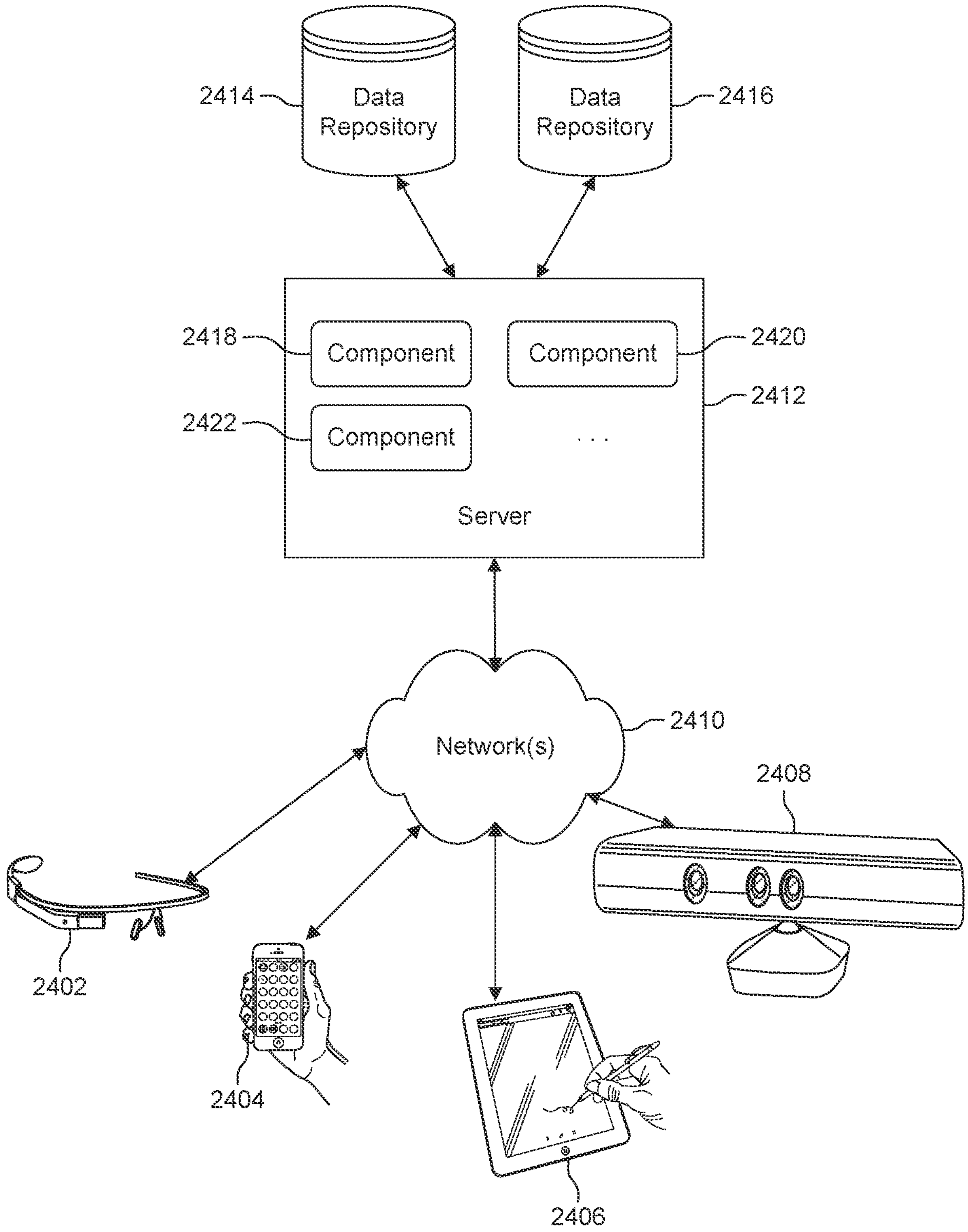
FIG. 24 depicts a simplified diagram of a distributed system for implementing certain aspects.

FIG. 24 depicts a simplified diagram of a distributed system 2400 for implementing an embodiment. In the illustrated embodiment, distributed system 2400 includes one or more client computing devices 2402, 2404, 2406, and 2408, coupled to a server 2412 via one or more communication networks 2410. Clients computing devices 2402, 2404, 2406, and 2408 may be configured to execute one or more applications.

In various aspects, server 2412 may be adapted to run one or more services or software applications that enable techniques for handling long text for pre-trained language models.

In certain aspects, server 2412 may also provide other services or software applications that can include non-virtual and virtual environments. In some aspects, these services may be offered as web-based or cloud services, such as under a Software as a Service (SaaS) model to the users of client computing devices 2402, 2404, 2406, and/or 2408. Users operating client computing devices 2402, 2404, 2406, and/or 2408 may in turn utilize one or more client applications to interact with server 2412 to utilize the services provided by these components.

In the configuration depicted in FIG. 24, server 2412 may include one or more components 2418, 2420 and 2422 that implement the functions performed by server 2412. These components may include software components that may be executed by one or more processors, hardware components, or combinations thereof. It should be appreciated that various different system configurations are possible, which may be different from distributed system 2400. The embodiment shown in FIG. 24 is thus one example of a distributed system for implementing an embodiment system and is not intended to be limiting.

Users may use client computing devices 2402, 2404, 2406, and/or 2408 for techniques for handling long text for pre-trained language models in accordance with the teachings of this disclosure. A client device may provide an interface that enables a user of the client device to interact with the client device. The client device may also output information to the user via this interface. Although FIG. 24 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 2410 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 2410 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 2412 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 2412 can include one or more virtual machines running virtual operating systems, or other computing architectures involving virtualization such as one or more flexible pools of logical storage devices that can be virtualized to maintain virtual storage devices for the server. In various aspects, server 2412 may be adapted to run one or more services or software applications that provide the functionality described in the foregoing disclosure.

The computing systems in server 2412 may run one or more operating systems including any of those discussed above, as well as any commercially available server operating system. Server 2412 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 2412 may include one or more applications to analyze and consolidate data feeds and/or event updates received from users of client computing devices 2402, 2404, 2406, and 2408. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 2412 may also include one or more applications to display the data feeds and/or real-time events via one or more display devices of client computing devices 2402, 2404, 2406, and 2408.

Distributed system 2400 may also include one or more data repositories 2414, 2416. These data repositories may be used to store data and other information in certain aspects. For example, one or more of the data repositories 2414, 2416 may be used to store information for techniques for handling long text for pre-trained language models (e.g., intent score, overall score). Data repositories 2414, 2416 may reside in a variety of locations. For example, a data repository used by server 2412 may be local to server 2412 or may be remote from server 2412 and in communication with server 2412 via a network-based or dedicated connection. Data repositories 2414, 2416 may be of different types. In certain aspects, a data repository used by server 2412 may be a database, for example, a relational database, such as databases provided by Oracle Corporation® and other vendors. One or more of these databases may be adapted to enable storage, update, and retrieval of data to and from the database in response to structured query language (SQL)-formatted commands.

In certain aspects, one or more of data repositories 2414, 2416 may also be used by applications to store application data. The data repositories used by applications may be of different types such as, for example, a key-value store repository, an object store repository, or a general storage repository supported by a file system.

In certain aspects, the techniques for handling long text for pre-trained language models functionalities described in this disclosure may be offered as services via a cloud environment. FIG. 24 is a simplified block diagram of a cloud-based system environment in which various text handling-related services may be offered as cloud services, in accordance with certain aspects. In the embodiment depicted in FIG. 24, cloud infrastructure system 2402 may provide one or more cloud services that may be requested by users using one or more client computing devices 2404, 2406, and 2408. Cloud infrastructure system 2402 may comprise one or more computers and/or servers that may include those described above for server 2412. The computers in cloud infrastructure system 2402 may be organized as general purpose computers, specialized server computers, server farms, server clusters, or any other appropriate arrangement and/or combination.

Network(s) 2410 may facilitate communication and exchange of data between clients 2404, 2406, and 2408 and cloud infrastructure system 2402. Network(s) 2410 may include one or more networks. The networks may be of the same or different types. Network(s) 2410 may support one or more communication protocols, including wired and/or wireless protocols, for facilitating the communications.

Figure 25:
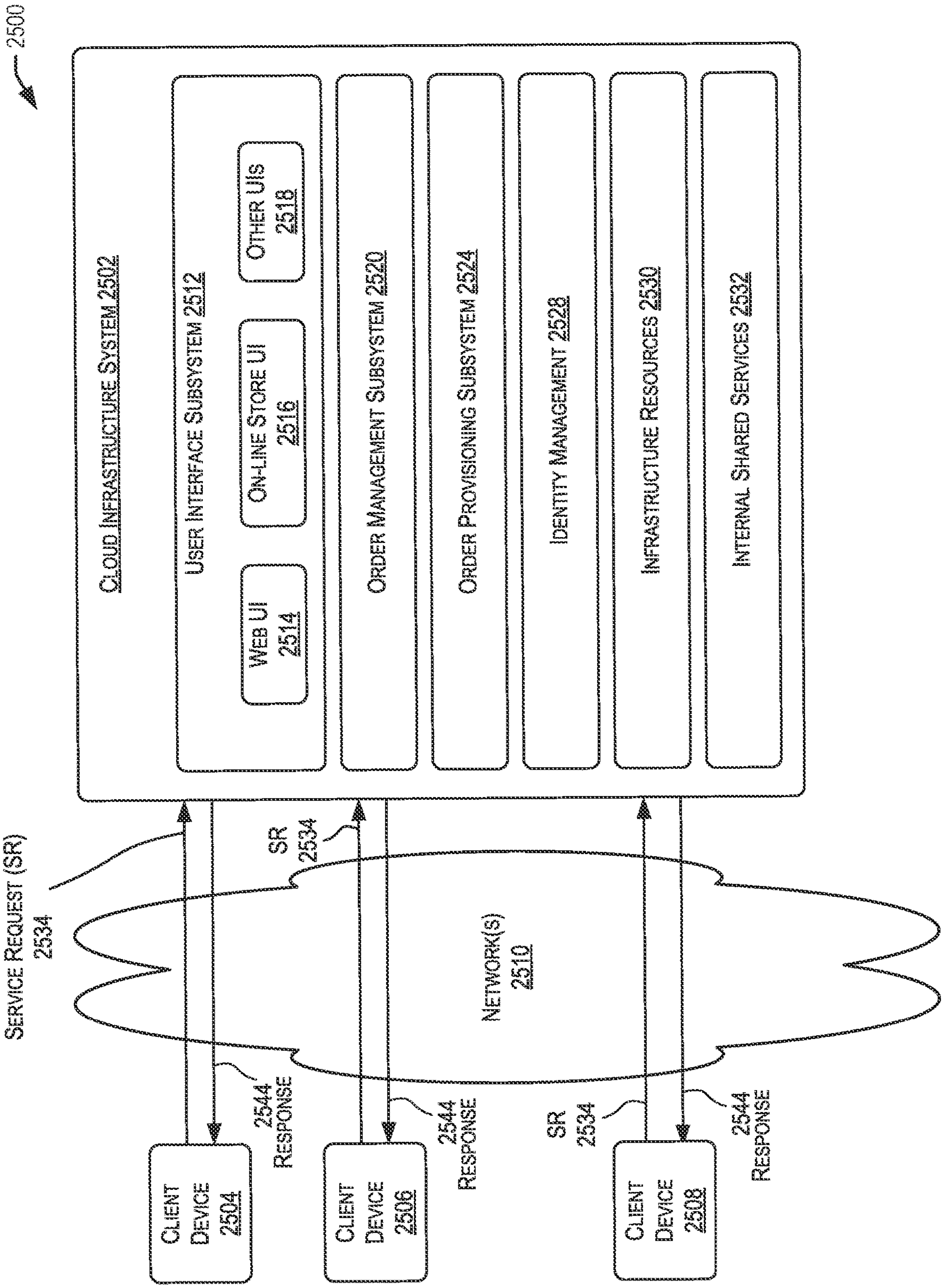
FIG. 25 is a simplified block diagram of one or more components of a system environment by which services provided by one or more components of an embodiment system may be offered as cloud services, in accordance with certain aspects.

The embodiment depicted in FIG. 25 is only one example of a cloud infrastructure system and is not intended to be limiting. It should be appreciated that, in some other aspects, cloud infrastructure system 2502 may have more or fewer components than those depicted in FIG. 25, may combine two or more components, or may have a different configuration or arrangement of components. For example, although FIG. 25 depicts three client computing devices, any number of client computing devices may be supported in alternative aspects.

The term cloud service is generally used to refer to a service that is made available to users on demand and via a communication network such as the Internet by systems (e.g., cloud infrastructure system 2502) of a service provider. Typically, in a public cloud environment, servers and systems that make up the cloud service provider's system are different from the customer's own on premise servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via a network 2510 (e.g., the Internet), on demand, order and use the application without the user having to buy infrastructure resources for executing the application. Cloud services are designed to provide easy, scalable access to applications, resources, and services. Several providers offer cloud services. For example, several cloud services are offered by Oracle Corporation® of Redwood Shores, California, such as middleware services, database services, Java cloud services, and others.

In certain aspects, cloud infrastructure system 2502 may provide one or more cloud services using different models such as under a Software as a Service (SaaS) model, a Platform as a Service (PaaS) model, an Infrastructure as a Service (IaaS) model, and others, including hybrid service models. Cloud infrastructure system 2502 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 2502. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware, and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 2502. Cloud infrastructure system 2502 then performs processing to provide the services requested in the customer's subscription order. Cloud infrastructure system 2502 may be configured to provide one or even multiple cloud services.

Cloud infrastructure system 2502 may provide the cloud services via different deployment models. In a public cloud model, cloud infrastructure system 2502 may be owned by a third party cloud services provider and the cloud services are offered to any general public customer, where the customer can be an individual or an enterprise. In certain other aspects, under a private cloud model, cloud infrastructure system 2502 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other aspects, under a community cloud model, the cloud infrastructure system 2502 and the services provided may be shared by several organizations in a related community. Various other models such as hybrids of the above mentioned models may also be used.

Client computing devices 2504, 2506, and 2508 may be of different types (such as devices 2402, 2404, 2406, and 2408 depicted in FIG. 24) and may be capable of operating one or more client applications. A user may use a client device to interact with cloud infrastructure system 2502, such as to request a service provided by cloud infrastructure system 2502. For example, a user may use a client device to request a chat bot service described in this disclosure.

In some aspects, the processing performed by cloud infrastructure system 2502 for providing Chabot services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 2502 for determining the intent of an utterance. The data used for this analysis may include structured data (e.g., data stored in a database or structured according to a structured model) and/or unstructured data (e.g., data blobs (binary large objects)).

As depicted in the embodiment in FIG. 25, cloud infrastructure system 2502 may include infrastructure resources 2530 that are utilized for facilitating the provision of various cloud services offered by cloud infrastructure system 2502. Infrastructure resources 2530 may include, for example, processing resources, storage or memory resources, networking resources, and the like.

In certain aspects, to facilitate efficient provisioning of these resources for supporting the various cloud services provided by cloud infrastructure system 2502 for different customers, the resources may be bundled into sets of resources or resource modules (also referred to as "pods"). Each resource module or pod may comprise a pre-integrated and optimized combination of resources of one or more types. In certain aspects, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 2502 may itself internally use services 2532 that are shared by different components of cloud infrastructure system 2502 and which facilitate the provisioning of services by cloud infrastructure system 2502. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 2502 may comprise multiple subsystems. These subsystems may be implemented in software, or hardware, or combinations thereof. As depicted in FIG. 25, the subsystems may include a user interface subsystem 2512 that enables users or customers of cloud infrastructure system 2502 to interact with cloud infrastructure system 2502. User interface subsystem 2512 may include various different interfaces such as a web interface 2514, an online store interface 2516 where cloud services provided by cloud infrastructure system 2502 are advertised and are purchasable by a consumer, and other interfaces 2518. For example, a customer may, using a client device, request (service request 2534) one or more services provided by cloud infrastructure system 2502 using one or more of interfaces 2514, 2516, and 2518. For example, a customer may access the online store, browse cloud services offered by cloud infrastructure system 2502, and place a subscription order for one or more services offered by cloud infrastructure system 2502 that the customer wishes to subscribe to. The service request may include information identifying the customer and one or more services that the customer desires to subscribe to. For example, a customer may place a subscription order for a Chabot related service offered by cloud infrastructure system 2502. As part of the order, the customer may provide information identifying for input (e.g., utterances).

In certain aspects, such as the embodiment depicted in FIG. 25, cloud infrastructure system 2502 may comprise an order management subsystem (OMS) 2520 that is configured to process the new order. As part of this processing, OMS 2520 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 2520 may then invoke the order provisioning subsystem (OPS) 2524 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 2524 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

Cloud infrastructure system 2502 may send a response or notification 2544 to the requesting customer to indicate when the requested service is now ready for use. In some instances, information (e.g., a link) may be sent to the customer that enables the customer to start using and availing the benefits of the requested services.

Cloud infrastructure system 2502 may provide services to multiple customers. For each customer, cloud infrastructure system 2502 is responsible for managing information related to one or more subscription orders received from the customer, maintaining customer data related to the orders, and providing the requested services to the customer. Cloud infrastructure system 2502 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 2502 may provide services to multiple customers in parallel. Cloud infrastructure system 2502 may store information for these customers, including possibly proprietary information. In certain aspects, cloud infrastructure system 2502 comprises an identity management subsystem (IMS) 2528 that is configured to manage customers information and provide the separation of the managed information such that information related to one customer is not accessible by another customer. IMS 2528 may be configured to provide various security-related services such as identity services, such as information access management, authentication and authorization services, services for managing customer identities and roles and related capabilities, and the like.

Figure 26:
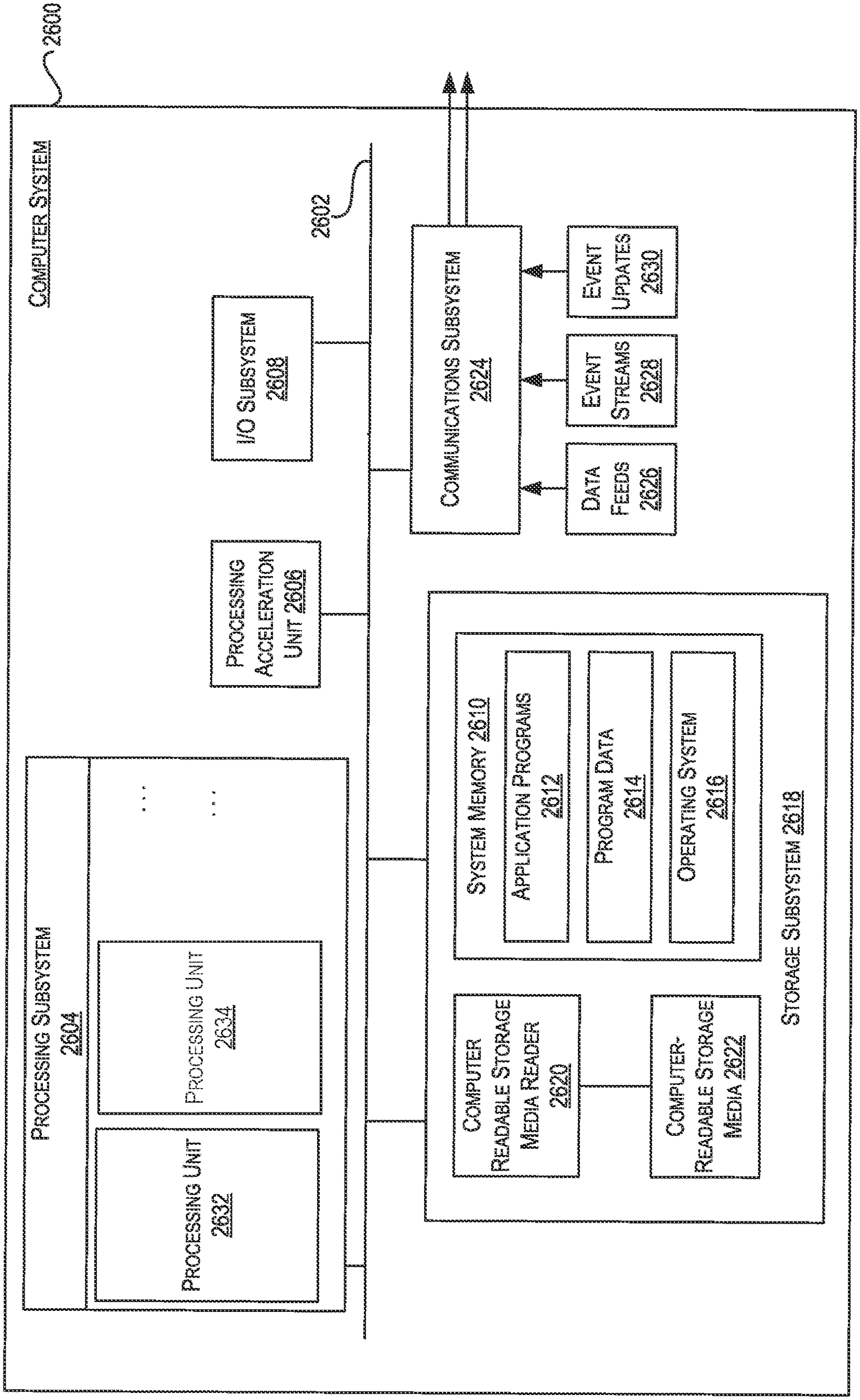
FIG. 26 illustrates an example computer system that may be used to implement certain aspects.

FIG. 26 illustrates an exemplary computer system 2600 that may be used to implement certain aspects. For example, in some aspects, computer system 2600 may be used to implement any of the system 400 for enriching log records with fields from other log records in structured format as shown in FIG. 1 and various servers and computer systems described above. As shown in FIG. 26, computer system 2600 includes various subsystems including a processing subsystem 2604 that communicates with a number of other subsystems via a bus subsystem 2602. These other subsystems may include a processing acceleration unit 2606, an I/O subsystem 2608, a storage subsystem 2618, and a communications subsystem 2624. Storage subsystem 2618 may include non-transitory computer-readable storage media including storage media 2622 and a system memory 2610.

Bus subsystem 2602 provides a mechanism for letting the various components and subsystems of computer system 2600 communicate with each other as intended. Although bus subsystem 2602 is shown schematically as a single bus, alternative aspects of the bus subsystem may utilize multiple buses. Bus subsystem 2602 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 2604 controls the operation of computer system 2600 and may comprise one or more processors, application specific integrated circuits (ASICs), or field programmable gate arrays (FPGAs). The processors may include be single core or multicore processors. The processing resources of computer system 2600 can be organized into one or more processing units 2632, 2634, etc. A processing unit may include one or more processors, one or more cores from the same or different processors, a combination of cores and processors, or other combinations of cores and processors. In some aspects, processing subsystem 2604 can include one or more special purpose co-processors such as graphics processors, digital signal processors (DSPs), or the like. In some aspects, some or all of the processing units of processing subsystem 2604 can be implemented using customized circuits, such as application specific integrated circuits (ASICs), or field programmable gate arrays (FPGAs).

In some aspects, the processing units in processing subsystem 2604 can execute instructions stored in system memory 2610 or on computer readable storage media 2622. In various aspects, the processing units can execute a variety of programs or code instructions and can maintain multiple concurrently executing programs or processes. At any given time, some or all of the program code to be executed can be resident in system memory 2610 and/or on computer-readable storage media 2622 including potentially on one or more storage devices. Through suitable programming, processing subsystem 2604 can provide various functionalities described above. In instances where computer system 2600 is executing one or more virtual machines, one or more processing units may be allocated to each virtual machine.

In certain aspects, a processing acceleration unit 2606 may optionally be provided for performing customized processing or for off-loading some of the processing performed by processing subsystem 2604 so as to accelerate the overall processing performed by computer system 2600.

I/O subsystem 2608 may include devices and mechanisms for inputting information to computer system 2600 and/or for outputting information from or via computer system 2600. In general, use of the term input device is intended to include all possible types of devices and mechanisms for inputting information to computer system 2600. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments, and the like.

In general, use of the term output device is intended to include all possible types of devices and mechanisms for outputting information from computer system 2600 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics, and audio/video information such as monitors, printers, speakers, headphones, automotive navigation systems, plotters, voice output devices, and modems.

Storage subsystem 2618 provides a repository or data store for storing information and data that is used by computer system 2600. Storage subsystem 2618 provides a tangible non-transitory computer-readable storage medium for storing the basic programming and data constructs that provide the functionality of some aspects. Storage subsystem 2618 may store software (e.g., programs, code modules, instructions) that when executed by processing subsystem 2604 provides the functionality described above. The software may be executed by one or more processing units of processing subsystem 2604. Storage subsystem 2618 may also provide a repository for storing data used in accordance with the teachings of this disclosure.

Storage subsystem 2618 may include one or more non-transitory memory devices, including volatile and non-volatile memory devices. As shown in FIG. 26, storage subsystem 2618 includes a system memory 2610 and a computer-readable storage media 2622. System memory 2610 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 2600, such as during start-up, may typically be stored in the ROM. The RAM typically contains data and/or program modules that are presently being operated and executed by processing subsystem 2604. In some implementations, system memory 2610 may include multiple different types of memory, such as static random access memory (SRAM), dynamic random access memory (DRAM), and the like.

By way of example, and not limitation, as depicted in FIG. 26, system memory 2610 may load application programs 2612 that are being executed, which may include various applications such as Web browsers, mid-tier applications, relational database management systems (RDBMS), etc., program data 2614, and an operating system 2616. By way of example, operating system 2616 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 2622 may store programming and data constructs that provide the functionality of some aspects. Computer-readable media 2622 may provide storage of computer-readable instructions, data structures, program modules, and other data for computer system 2600. Software (programs, code modules, instructions) that, when executed by processing subsystem 2604 provides the functionality described above, may be stored in storage subsystem 2618. By way of example, computer-readable storage media 2622 may include non-volatile memory such as a hard disk drive, a magnetic disk drive, an optical disk drive such as a CD ROM, digital video disc (DVD), a Blu-Ray® disk, or other optical media. Computer-readable storage media 2622 may include, but is not limited to, Zip® drives, flash memory cards, universal serial bus (USB) flash drives, secure digital (SD) cards, DVD disks, digital video tape, and the like. Computer-readable storage media 2622 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, dynamic random access memory (DRAM)-based SSDs, magnetoresistive RAM (MRAM) SSDs, and hybrid SSDs that use a combination of DRAM and flash memory based SSDs.

In certain aspects, storage subsystem 2618 may also include a computer-readable storage media reader 2620 that can further be connected to computer-readable storage media 2622. Reader 2620 may receive and be configured to read data from a memory device such as a disk, a flash drive, etc.

In certain aspects, computer system 2600 may support virtualization technologies, including but not limited to virtualization of processing and memory resources. For example, computer system 2600 may provide support for executing one or more virtual machines. In certain aspects, computer system 2600 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 2600. Accordingly, multiple operating systems may potentially be run concurrently by computer system 2600.

Communications subsystem 2624 provides an interface to other computer systems and networks. Communications subsystem 2624 serves as an interface for receiving data from and transmitting data to other systems from computer system 2600. For example, communications subsystem 2624 may enable computer system 2600 to establish a communication channel to one or more client devices via the Internet for receiving and sending information from and to the client devices. For example, the communication subsystem may be used to transmit a response to a user regarding the inquiry for a Chabot.

Communication subsystem 2624 may support both wired and/or wireless communication protocols. For example, in certain aspects, communications subsystem 2624 may include radio frequency (RF) transceiver components for accessing wireless voice and/or data networks (e.g., using cellular telephone technology, advanced data network technology, such as 3G, 4G or EDGE (enhanced data rates for global evolution), Wi-Fi (IEEE 802.XX family standards, or other mobile communication technologies, or any combination thereof), global positioning system (GPS) receiver components, and/or other components. In some aspects communications subsystem 2624 can provide wired network connectivity (e.g., Ethernet) in addition to or instead of a wireless interface.

Communication subsystem 2624 can receive and transmit data in various forms. For example, in some aspects, in addition to other forms, communications subsystem 2624 may receive input communications in the form of structured and/or unstructured data feeds 2626, event streams 2628, event updates 2630, and the like. For example, communications subsystem 2624 may be configured to receive (or send) data feeds 2626 in real-time from users of social media networks and/or other communication services such as Twitter® feeds, Facebook® updates, web feeds such as Rich Site Summary (RSS) feeds, and/or real-time updates from one or more third party information sources.

In certain aspects, communications subsystem 2624 may be configured to receive data in the form of continuous data streams, which may include event streams 2628 of real-time events and/or event updates 2630, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 2624 may also be configured to communicate data from computer system 2600 to other computer systems or networks. The data may be communicated in various different forms such as structured and/or unstructured data feeds 2626, event streams 2628, event updates 2630, and the like to one or more databases that may be in communication with one or more streaming data source computers coupled to computer system 2600.

Computer system 2600 can be one of various types, including a handheld portable device (e.g., an iPhone® cellular phone, an iPad® computing tablet, a personal digital assistant (PDA)), a wearable device (e.g., a Google Glass® head mounted display), a personal computer, a workstation, a mainframe, a kiosk, a server rack, or any other data processing system. Due to the ever-changing nature of computers and networks, the description of computer system 2600 depicted in FIG. 26 is intended only as a specific example. Many other configurations having more or fewer components than the system depicted in FIG. 26 are possible. Based on the disclosure and teachings provided herein, a person of ordinary skill in the art can appreciate other ways and/or methods to implement the various aspects.

Although specific aspects have been described, various modifications, alterations, alternative constructions, and equivalents are possible. Embodiments are not restricted to operation within certain specific data processing environments, but are free to operate within a plurality of data processing environments. Additionally, although certain aspects have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described aspects may be used individually or jointly.

Further, while certain aspects have been described using a particular combination of hardware and software, it should be recognized that other combinations of hardware and software are also possible. Certain aspects may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the aspects. However, aspects may be practiced without these specific details. For example, well-known circuits, processes, algorithms, structures, and techniques have been shown without unnecessary detail in order to avoid obscuring the aspects. This description provides example aspects only, and is not intended to limit the scope, applicability, or configuration of other aspects. Rather, the preceding description of the aspects can provide those skilled in the art with an enabling description for implementing various aspects. Various changes may be made in the function and arrangement of elements.

The specification and drawings are, accordingly, to be regarded in an illustrative rather than a restrictive sense. It can, however, be evident that additions, subtractions, deletions, and other modifications and changes may be made thereunto without departing from the broader spirit and scope as set forth in the claims. Thus, although specific aspects have been described, these are not intended to be limiting. Various modifications and equivalents are within the scope of the following claims.

What is claimed is:

1. A computer-implemented method comprising:

accessing a plurality of log records, each of the plurality of log records including data that accords with a particular data structure, wherein:

the plurality of log records have a particular order, the plurality of log records are associated with a particular client, and the particular data structure is a hierarchical structure;

extracting a set of individual log records from the plurality of log records, wherein each of the set of individual log records is at a same level within a hierarchy defined for the particular data structure;

identifying, via an automated pattern detection technique, a first syntax of header messages based on the data corresponding to the particular client;

identifying, via the automated pattern detection technique, a second syntax of detail messages based on the data corresponding to the particular client, wherein the automated pattern detection technique detects differences between the first syntax and the second syntax based on labels associated with the data corresponding to the particular client;

automatically detecting, via a first parser of one or more parsers, that each of a first subset of the set of individual log records includes header information based on the first syntax of the header messages;

automatically detecting, via a second parser of the one or more parsers, that each of a second subset of the set of individual log records includes detail information based on the second syntax of the detail messages;

determining, for a particular detail message in the second subset, that header information from at least one header message in the first subset of the set of individual log records is associated with detail information in the particular detail message, wherein the determination is based on establishing a header-detail relationship via a function on at least part of the particular order;

adding, via the function, the header information in the at least one header message to the particular detail message based on the header-detail relationship to enrich the particular detail message; and displaying the enriched particular detail message on a user interface for data processing, wherein the user interface includes a log search facility, one or more dashboards or applications for analyzing the enriched particular detail message, and wherein the data processing is configured to automatically retrieve enriched detail messages that are associated with the header information in the at least one header message through a single search via the log search facility.

2. The computer-implemented method of claim 1, wherein the establishing the header-detail relationship between the header messages and the detail messages comprises:

detecting, for each of the at least one header message in the first subset, a start indicator indicating a start of an object before the particular detail message and a lack of a corresponding end indicator before the particular detail message.

3. The computer-implemented method of claim 1, wherein the first syntax of the header messages or the second syntax of the detail messages is identified by receiving an input via the user interface.

4. The computer-implemented method of claim 1, wherein determining that the header information from the at least one header message in the first subset of the set of individual log records is associated with the detail information in the particular detail message comprises:

determining that a start indicator for the at least one header message precedes the particular detail message in the particular order; and determining that a completion of the particular detail message preceded any end indicator for the at least one header message.

5. The computer-implemented method of claim 1, wherein determining that the header information from the at least one header message in the first subset of the set of individual log records is associated with the detail information in the particular detail message comprises:

retrieving the header information from the at least one header message in the first subset of the set of individual log records from a cache.

6. The computer-implemented method of claim 1, wherein at least part of the at least one header message is after the particular detail message in the particular order.

7. The computer-implemented method of claim 1, wherein a syntax specification for the first syntax includes a particular keyword or a particular key-value pair associated with the particular client.

8. A system comprising:

one or more processors; and a memory coupled to the one or more processors, the memory storing a plurality of instructions executable by the one or more processors, the plurality of instructions that when executed by the one or more processors cause the one or more processors to perform a set of operations comprising:

accessing a plurality of log records, each of the plurality of log records including data that accords with a particular data structure, wherein:

the plurality of log records have a particular order, the plurality of log records are associated with a particular client, and the particular data structure is a hierarchical structure;

extracting a set of individual log records from the plurality of log records, wherein each of the set of individual log records is at a same level within a hierarchy defined for the particular data structure;

identifying, via an automated pattern detection technique, a first syntax of header messages based on the data corresponding to the particular client;

identifying, via the automated pattern detection technique, a second syntax of detail messages based on the data corresponding to the particular client, wherein the automated pattern detection technique detects differences between the first syntax and the second syntax based on labels associated with the data corresponding to the particular client;

automatically detecting, via a first parser of one or more parsers, that each of a first subset of the set of individual log records includes header information based on the first syntax of the header messages;

automatically detecting, via a second parser of the one or more parsers, that each of a second subset of the set of individual log records includes detail information based on the second syntax of the detail messages;

determining, for a particular detail message in the second subset, that header information from at least one header message in the first subset of the set of individual log records is associated with detail information in the particular detail message, wherein the determination is based on establishing a header-detail relationship via a function on at least part of the particular order;

adding, via the function, the header information in the at least one header message to the particular detail message based on the header-detail relationship to enrich the particular detail message; and displaying the enriched particular detail message on a user interface for data processing, wherein the user interface includes a log search facility, one or more dashboards or applications for analyzing the enriched particular detail message, and wherein the data processing is configured to automatically retrieve enriched detail messages that are associated with the header information in the at least one header message through a single search via the log search facility.

9. The system of claim 8, wherein the establishing the header-detail relationship between the header messages and the detail messages comprises:

detecting, for each of the at least one header message in the first subset, a start indicator indicating a start of an object before the particular detail message and a lack of a corresponding end indicator before the particular detail message.

10. The system of claim 8, wherein the first syntax of for the header messages or the second syntax of the detail messages is identified by receiving an input via the user interface.

11. The system of claim 8, wherein determining that the header information from the at least one header message in the first subset of the set of individual log records is associated with the detail information in the particular detail message comprises:

determining that a start indicator for the at least one header message precedes the particular detail message in the particular order; and determining that a completion of the particular detail message preceded any end indicator for the at least one header message.

12. The system of claim 8, wherein determining that the header information from the at least one header message in the first subset of the set of individual log records is associated with the detail information in the particular detail message comprises:

retrieving the header information from the at least one header message in the first subset of the set of individual log records from a cache.

13. The system of claim 8, wherein at least part of the at least one header message is after the particular detail message in the particular order.

14. The system of claim 8, wherein a syntax specification for the first syntax includes a particular keyword or a particular key-value pair associated with the particular client.

15. A non-transitory computer-readable medium storing a plurality of instructions executable by one or more processors that cause the one or more processors to perform operations comprising:

accessing a plurality of log records, each of the plurality of log records including data that accords with a particular data structure, wherein:

the plurality of log records have a particular order, the plurality of log records are associated with a particular client, and the particular data structure is a hierarchical structure;

extracting a set of individual log records from the plurality of log records, wherein each of the set of individual log records is at a same level within a hierarchy defined for the particular data structure;

identifying, via an automated pattern detection technique, a first syntax of header messages based on the data corresponding to the particular client;

identifying, via the automated pattern detection technique, a second syntax of detail messages based on the data corresponding to the particular client, wherein the automated pattern detection technique detects differences between the first syntax and the second syntax based on labels associated with the data corresponding to the particular client;

automatically detecting, via a first parser of a one or more parsers, that each of a first subset of the set of individual log records includes header information based on the first syntax of the header messages;

automatically detecting, via a second parser of the one or more parsers, that each of a second subset of the set of individual log records includes detail information based on the second syntax of the detail messages;

determining, for a particular detail message in the second subset, that header information from at least one header message in the first subset of the set of individual log records is associated with detail information in the particular detail message, wherein the determination is based on establishing a header-detail relationship via a function on at least part of the particular order;

adding, via the function, the header information in the at least one header message to the particular detail message based on the header-detail relationship to enrich the particular detail message; and displaying the enriched particular detail message on a user interface for data processing, wherein the user interface includes a log search facility, one or more dashboards or applications for analyzing the enriched particular detail message, and wherein the data processing is configured to automatically retrieve enriched detail messages that are associated with the header information in the at least one header message through a single search via the log search facility.

16. The non-transitory computer-readable medium of claim 15, wherein the establishing the header-detail relationship between the header messages and detail messages comprises:

detecting, for each of the at least one header message in the first subset, a start indicator indicating a start of an object before the particular detail message and a lack of a corresponding end indicator before the particular detail message.

17. The non-transitory computer-readable medium of claim 15, wherein the first syntax of the header messages or the second syntax of the detail messages is identified by receiving an input via the user interface.

18. The non-transitory computer-readable medium of claim 15, wherein determining that the header information from the at least one header message in the first subset of the set of individual log records is associated with the detail information in the particular detail message comprises:

determining that a start indicator for the at least one header message precedes the particular detail message in the particular order; and determining that a completion of the particular detail message preceded any end indicator for the at least one header message.

19. The non-transitory computer-readable medium of claim 15, wherein determining that the header information from the at least one header message in the first subset of the set of individual log records is associated with the detail information in the particular detail message comprises:

retrieving the header information from the at least one header message in the first subset of the set of individual log records from a cache.

20. The non-transitory computer-readable medium of claim 15, wherein at least part of the at least one header message is after the particular detail message in the particular order.

* * * * *

UNITED STATES PATENT AND TRADEMARK OFFICE

CERTIFICATE OF CORRECTION

PATENT NO. : 12,367,241 B2
APPLICATION NO. : 18/448058
DATED : July 22, 2025
INVENTOR(S) : Singh et al.

It is certified that error appears in the above-identified patent and that said Letters Patent is hereby corrected as shown below:

In the Specification

In Column 4, Line 39, delete “log” and insert -- log. --, therefor.

In Column 5, Line 58, delete “information” and insert -- information. --, therefor.

In Column 8, Line 63, delete “that that” and insert -- that --, therefor.

In Column 11, Line 63, delete “S/*/” and insert -- $[*] --, therefor.

In Column 14, Line 10, delete “that that” and insert -- that --, therefor.

In Column 22, Line 53, delete “system” and insert -- system. --, therefor.

In Column 31, Line 27, delete “Xbox” and insert -- Xbox® --, therefor.

In the Claims

In Column 37, Line 48, in Claim 10, delete “of for” and insert -- of --, therefor.

Signed and Sealed this
Sixteenth Day of December, 2025

John A. Squires
*Director of the United States Patent and Trademark Office*